(12) United States Patent
Lee et al.

(10) Patent No.: US 10,657,094 B2
(45) Date of Patent: May 19, 2020

(54) RELAXED 433 ENCODING TO REDUCE COUPLING AND POWER NOISE ON PAM-4 DATA BUSES

(71) Applicant: NVIDIA Corp., Santa Clara, CA (US)

(72) Inventors: Donghyuk Lee, Cedar Park, TX (US); James Michael O'Connor, Austin, TX (US); John Wilson, Wake Forest, NC (US)

(73) Assignee: NVIDIA Corp., Santa Clara, CA (US)

( * ) Notice: Subject to any disclaimer, the term of this patent is extended or adjusted under 35 U.S.C. 154(b) by 0 days.

(21) Appl. No.: 16/295,595

(22) Filed: Mar. 7, 2019

(65) Prior Publication Data

US 2019/0303339 A1 Oct. 3, 2019

Related U.S. Application Data

(60) Provisional application No. 62/650,168, filed on Mar. 29, 2018.

(51) Int. Cl.
*G06F 13/42* (2006.01)
*H04L 1/00* (2006.01)
*H04L 25/49* (2006.01)

(52) U.S. Cl.
CPC ........ *G06F 13/4282* (2013.01); *H04L 1/0061* (2013.01); *H04L 25/4917* (2013.01)

(58) Field of Classification Search
CPC ............. H04L 1/0061; H04L 251/4917; G06F 13/4282
See application file for complete search history.

(56) References Cited

U.S. PATENT DOCUMENTS

| | | | |
|---|---|---|---|
| 4,739,323 A | 4/1988 | Miesterfeld et al. | |
| 4,742,349 A | 5/1988 | Miesterfeld et al. | |
| 5,377,020 A | 12/1994 | Smitt | |
| 5,572,736 A | 11/1996 | Curran | |
| 6,285,300 B1 | 9/2001 | Colon-Bonet | |
| 6,604,120 B1 | 8/2003 | De | |
| 7,149,955 B1 | 12/2006 | Sutardja et al. | |
| 7,188,263 B1 | 3/2007 | Rubinstein et al. | |
| 7,620,116 B2 | 11/2009 | Bessios et al. | |
| 8,022,726 B2* | 9/2011 | Candage | H02M 3/1584 323/272 |
| 8,181,101 B2 | 5/2012 | Shen et al. | |
| 8,359,498 B1 | 1/2013 | Sutardja et al. | |
| 8,984,380 B2* | 3/2015 | Vijayaraghavan | H03M 13/353 370/445 |

(Continued)

FOREIGN PATENT DOCUMENTS

DE 102019108205 A1 10/2019

OTHER PUBLICATIONS

Khandelwal et a,l DesignCon 2016, Inphi ,2016, (Year: 2016).*

(Continued)

*Primary Examiner* — Henry Tsai
*Assistant Examiner* — Christopher Daley
(74) *Attorney, Agent, or Firm* — Rowan TELS LLC

(57) ABSTRACT

Methods of operating a serial data bus divide series of data bits into sequences of one or more bits and encode the sequences as N-level symbols, which are then transmitted at multiple discrete voltage levels. These methods may be utilized to communicate over serial data lines to improve bandwidth and reduce crosstalk and other sources of noise.

20 Claims, 21 Drawing Sheets

(56) References Cited

U.S. PATENT DOCUMENTS

| | | | |
|---|---|---|---|
| 9,184,906 B1 | 11/2015 | Min et al. | |
| 9,231,704 B1* | 1/2016 | Zhou | H04B 10/58 |
| 9,240,907 B2* | 1/2016 | Wang | H04L 25/02 |
| 9,244,763 B1 | 1/2016 | Kankani et al. | |
| 9,548,858 B1 | 1/2017 | Cirit et al. | |
| 9,564,990 B1 | 2/2017 | Tiruvur et al. | |
| 9,853,769 B1* | 12/2017 | Farjad | H04L 1/0041 |
| 9,942,063 B2 | 4/2018 | Mendel | |
| 10,312,896 B2* | 6/2019 | Kim | H04L 27/04 |
| 2003/0035497 A1 | 2/2003 | Gorecki et al. | |
| 2003/0108134 A1 | 6/2003 | Stonick et al. | |
| 2004/0114692 A1 | 6/2004 | Matsumoto | |
| 2005/0086417 A1 | 4/2005 | Meyer et al. | |
| 2005/0089126 A1* | 4/2005 | Zerbe | H04L 1/0003 375/353 |
| 2006/0109917 A1 | 5/2006 | Fonseka et al. | |
| 2006/0139186 A1 | 6/2006 | Royer | |
| 2006/0280272 A1* | 12/2006 | Stojanovic | H04L 7/0331 375/355 |
| 2007/0203962 A1 | 8/2007 | Hirairi | |
| 2008/0181331 A1* | 7/2008 | Casper | H04L 25/4917 375/300 |
| 2008/0262855 A1 | 10/2008 | Mehrotra et al. | |
| 2009/0193319 A1 | 7/2009 | Shen et al. | |
| 2009/0323722 A1 | 12/2009 | Sharma | |
| 2010/0174844 A1 | 7/2010 | Chu | |
| 2010/0299440 A1* | 11/2010 | Meyer | G06F 13/161 709/226 |
| 2011/0264719 A1 | 10/2011 | Mortensen | |
| 2012/0110255 A1 | 5/2012 | Meyer et al. | |
| 2012/0144161 A1 | 6/2012 | Elliott | |
| 2012/0204082 A1 | 8/2012 | Shen et al. | |
| 2012/0206280 A1 | 8/2012 | Abbasfar et al. | |
| 2012/0250746 A1 | 10/2012 | Sonntag | |
| 2013/0226982 A1 | 8/2013 | Yu | |
| 2014/0153620 A1 | 6/2014 | Longo et al. | |
| 2014/0173296 A1 | 6/2014 | Muff et al. | |
| 2014/0281075 A1 | 9/2014 | Hollis | |
| 2014/0298458 A1 | 10/2014 | Lewis et al. | |
| 2014/0358979 A1 | 12/2014 | Singh | |
| 2015/0137789 A1 | 5/2015 | Furtner | |
| 2015/0235634 A1 | 8/2015 | Liu et al. | |
| 2016/0013958 A1 | 1/2016 | Mishra et al. | |
| 2016/0164705 A1 | 6/2016 | Whitby-Strevens | |
| 2016/0173134 A1 | 6/2016 | Kwon et al. | |
| 2016/0373557 A1* | 12/2016 | Sikkink | H04L 69/08 |
| 2017/0075854 A1 | 3/2017 | Hollis | |
| 2017/0207908 A1 | 7/2017 | Cirit et al. | |
| 2017/0220518 A1 | 8/2017 | Sengoku et al. | |
| 2017/0310529 A1* | 10/2017 | Yang | H04L 25/493 |
| 2017/0373887 A1 | 12/2017 | Ho | |
| 2018/0091189 A1 | 3/2018 | Chada et al. | |
| 2018/0091335 A1 | 3/2018 | Schnizler | |
| 2019/0199560 A1 | 6/2019 | Bossard et al. | |
| 2019/0303340 A1 | 10/2019 | Lee et al. | |
| 2019/0305995 A1 | 10/2019 | Lee et al. | |

OTHER PUBLICATIONS

Zhang et al, PAM4 Signalling for 56G Serial Link Applications—A Tutorial (Year: 2016).*
U.S. Appl. No. 16/557,637, filed Aug. 30, 2019, Sunil Sudhakaran.
AN 835 PAM4 Signaling Fundamentals by INTEL 03122019.
Hossain et al, Channel-Adaptive ADC and TDC for 28 Gb/s PAM-4 Digital Receiver.
Im et al, A 40-to-56 Gb/s PAM-4 Receiver With Ten-Tap Direct Decision-Feedback Equalization in 16-nm FinFET.
Low Power Bus Transform Coding for Multi Level Signals 2006 ZAMAN.
P. S. Teja, "Design of Radix-8 Booth Multiplier Using Koggestone Adder for High Speed Arithmetic Applications," Emerging Trends in Electrical, Electronics & Instrumentation Engineering: An international Journal (EEIEJ), vol. 1, No. 1, Feb. 2014 (Year: 2014).
Pupalaikis et al, Designcon 2017, Inphi, 2017, (Year: 2017).
S. Samavi, "High Radix Multipliers," Jan. 2014, retrieved from https://www.researchgate.net/publication/262836009 (Year: 2014).
Space Coding Applied to High Speed Chip FARZAN 2004.

* cited by examiner

| bits to encode | Bridging 4-level symbols (L: 0X, H: 1X) | | | |
|---|---|---|---|---|
| | L↔L | H↔H | L↔H | H↔L |
| 000 | 00 01 | 01 11 | 00 01 | 01 00 |
| 001 | 01 00 | 11 01 | 01 11 | 11 01 |
| 010 | 00 10 | 11 10 | 00 10 | 11 10 |
| 011 | 10 00 | 10 11 | 10 11 | 10 00 |
| 100 | 01 01 | 01 01 | 01 01 | 01 01 |
| 101 | 01 10 | 01 10 | 01 10 | 01 10 |
| 110 | 10 01 | 10 01 | 10 01 | 10 01 |
| 111 | 10 10 | 10 10 | 10 10 | 10 10 |

RELAXED 433 ENCODING TO REDUCE COUPLING AND POWER NOISE ON PAM-4 DATA BUSES

CROSS REFERENCE TO RELATED APPLICATIONS

This application claims the benefit of U.S. provisional patent application Ser. No. 62/650,168, filed on Mar. 28, 2018, the contents of which are incorporated herein by reference in their entirety.

BACKGROUND

Modern high throughput systems utilize multiple high bandwidth input/output interfaces to form a signaling network between compute units, memory devices, and storage devices. For example, Peripheral Component Interconnect Express (PCI-E) connects multiple periphery devices to central processing units (CPUs) and graphics processing units (GPUs). These interfaces may comprise multiple serial data buses that operate at high frequency.

Pulse amplitude modulation (PAM) may be utilized on a multi-lane serial data bus to transfer multiple bits of data simultaneously by encoding the data as different voltage levels. Here, "lane" refers to a single data lane of a serial data bus. A "data burst" refers to bits placed on the data lanes of a serial data bus in a same bus clock interval, i.e., in parallel.

An example of PAM communication is PAM-4. During each bus clock interval, PAM-4 encodes two bits of data (00, 01, 10, 11) on each data lane of a serial data bus as one of four different voltage levels (symbols). Because two bits are encoded into each bus clock interval on each data lane, PAM-4 ideally enables twice the bandwidth compared to conventional two-level (e.g., PAM-2) signaling on serial data buses operating at comparable bus clock frequencies. PAM-4 symbols utilize four different voltage levels and therefore there is less voltage-level distinction between symbol values in PAM-4 compared to PAM-2. This makes PAM-4 communications more vulnerable to interference effects such as coupling noise between data lanes on a serial data bus, and power supply noise, which reduces the signal to noise ratio (SNR).

One mechanism to mitigate these noise effects is to utilize Data Bus Inversion (DBI). For a given data burst, DBI reduces the total extent of voltage level transitions across the data lanes of a serial data bus by up to half by intelligently setting the polarity of the bits in each data burst on the serial data bus. DBI requires an additional metadata bit per data burst to transfer the data burst polarity setting (non-inverted data burst, or inverted data burst) to the receiver. This metadata bit is often transmitted on an extra data lane that is separate from the data lanes (each also one data lane, typically) of the serial data bus.

Many serial data buses comprise only a single data lane between the transmitter and the receiver. Adding an additional metadata data lane can thus result in up to 100% overhead in the number of data lanes required for the serial data bus.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 4 illustrates a PAM-433 encoder 400 in accordance with one embodiment.

DETAILED DESCRIPTION

Figure 1:
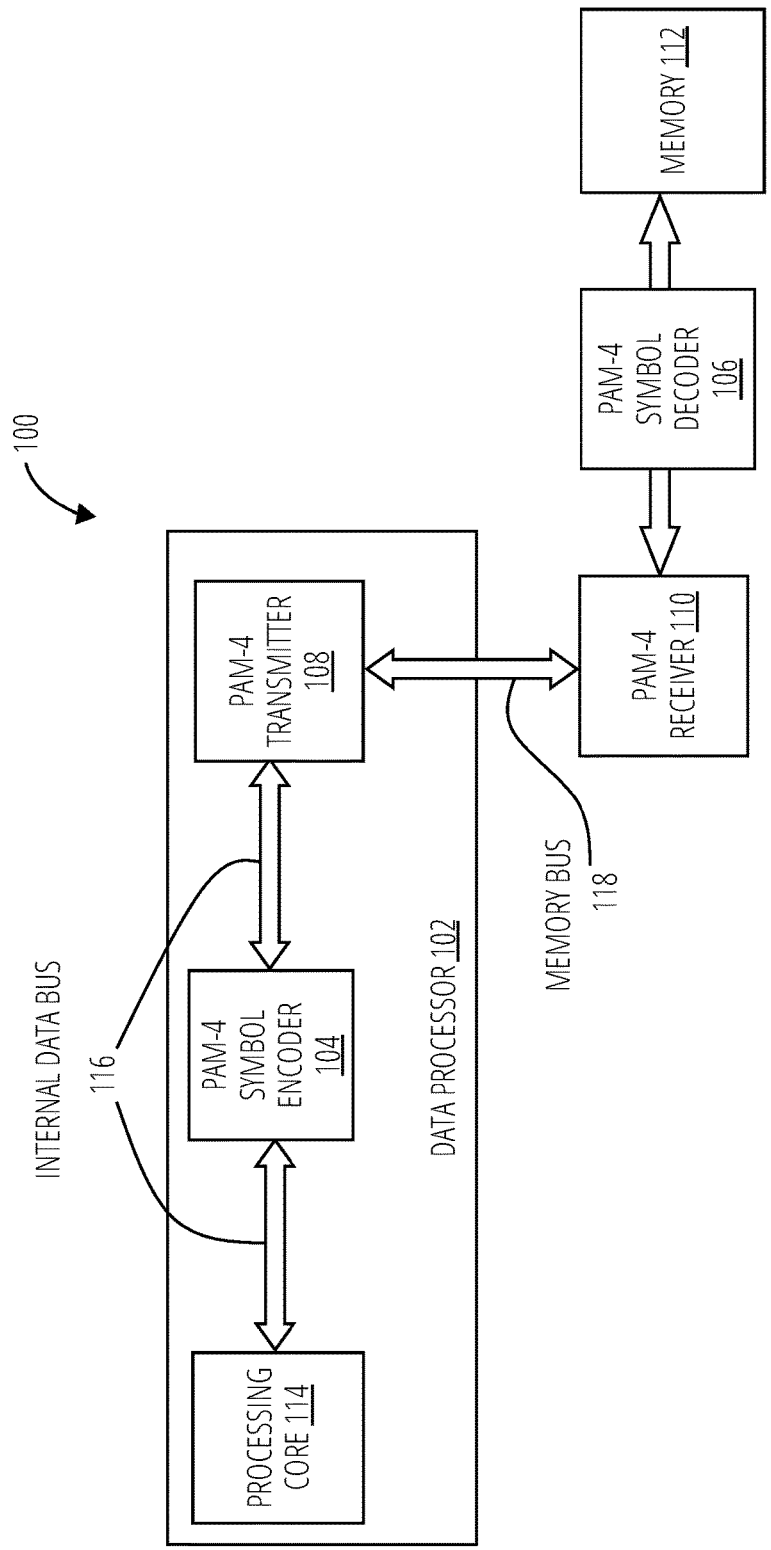
FIG. 1 illustrates a data communication system 100 in accordance with one embodiment.

Referring to FIG. 1, a data communication system 100 comprises a transmitting device such as a data processor 102 that includes a processing core 114, PAM-4 symbol encoder 104, and a PAM-4 transmitter 108. The data processor 102 may in some embodiments comprise a graphics processing unit (GPU), a central processing unit (CPU), a system on a chip (SoC), or other well-known data processing devices.

The data processor 102 communicates with a receiving device such as a memory 112 over a bus such as a memory bus 118. A PAM-4 receiver 110 and PAM-4 symbol decoder 106 receive and process PAM-4 signals communicated from the data processor 102 to the memory 112 over the memory bus 118.

The data processor 102 utilizes an internal data bus 116 to transmit data bursts to and from the processing core 114 over a multi-lane internal data bus 116. The PAM-4 symbol encoder 104 receives a burst of data to encode from the processing core 114 and performs PAM-4 encoding on that burst. The PAM-4 transmitter 108 transmits the encoded burst to the PAM-4 receiver 110 via the memory bus 118. The PAM-4 receiver 110 receives the encoded burst and sends the encoded burst to the PAM-4 symbol decoder 106 to decode the burst. Once decoded, the burst is sent to the memory 112.

This is a simplified diagram. In practice, there would typically be encoders and decoders on both ends of the memory bus 118 for both writing to and reading from the memory 112.

Figure 2:
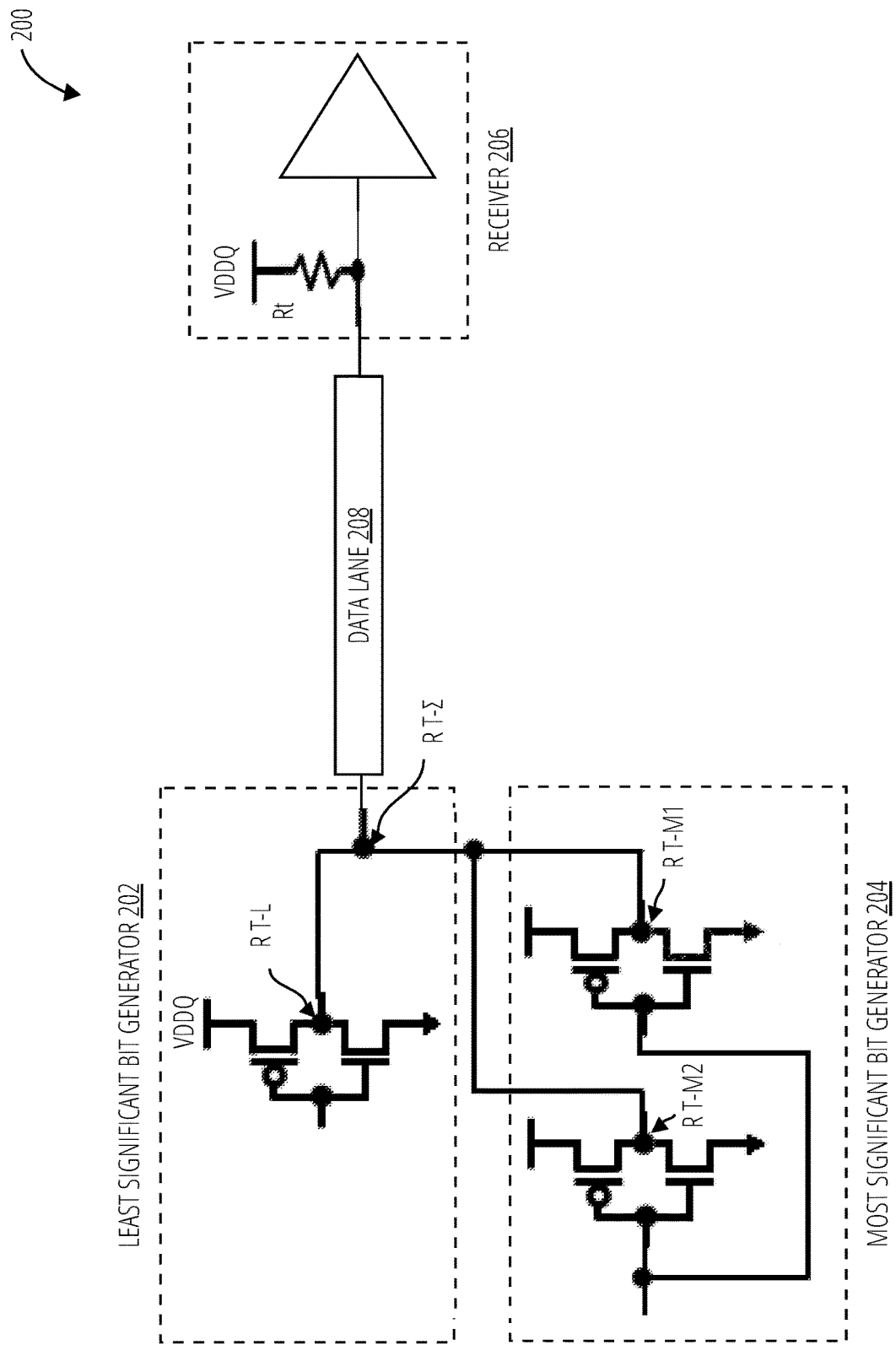
FIG. 2 illustrates an embodiment of a PAM-4 transceiver 200.

FIG. 2 illustrates a PAM-4 transceiver 200 for a single data lane of a serial data bus in one embodiment. The PAM-4 transceiver 200 comprises a least significant bit transmitter 202, a most significant bit transmitter 204, a receiver 206, and a data lane 208. The PAM-4 transceiver 200 utilizes the least significant bit transmitter 202 and the most significant bit transmitter 204 to generate a four-level symbol on the data lane 208. Herein the term "symbol" refers to a voltage level generated by a line driver on a serial data bus data lane, where the voltage level represents the value of one or more bits of data. Thus "encoding a symbol" means physically configuring a line driver circuit of the serial data bus to drive the voltage on the data lane to a particular value.

For example, if the two bits of data to encode into the symbol are (1,1), the outputs of the least significant bit transmitter 202 and most significant bit transmitter 204 combine to generate a voltage of, e.g., 1.2 V on the data lane 208, and current on the data lane 208 is, e.g., 0 mA, due to the pull-up transistor Rt at the receiver 206 (both ends of the data lane 208 are at the same potential). If the two bits of data to encode into the symbol are (1,0), the outputs of the least significant bit transmitter 202 and most significant bit transmitter 204 combine to generate a voltage of, e.g., 1.0 V, on the data lane 208, and current on the data lane 208 is, e.g., 5 mA. If the two bits of data to encode into the symbol are (0,1), the outputs of the least significant bit transmitter 202 and most significant bit transmitter 204 combine to generate a voltage of, e.g., 0.8 V, on the data lane 208, and current on the data lane 208 is, e.g., 10 mA. If the two bits of data to encode into the symbol are (0,0), the outputs of the least significant bit transmitter 202 and most significant bit transmitter 204 combine to generate a voltage of, e.g., 0.6 V, on the data lane 208, and current on the data lane 208 is, e.g., 15 mA. The 0.6V may be referred to herein as the base transmission voltage $V_b$ from which the other symbol voltage levels are delta-ed.

The symbol value on a data lane therefore corresponds to the current consumption of that data lane during a data burst. Weights may therefore be assigned to the symbol values reflecting their current consumption cost. For example, a weight of 0 may be assigned to the symbol for the bit pair (1,1); a weight of 1 may be assigned for the symbol for the bit pair (1,0); a weight of 2 may be assigned to the symbol for the bit pair (0,1); and a weight of 3 may be assigned for the symbol for the bit pair (0,0).

In this example, a data burst on an eight lane serial data bus utilizing PAM-4 encoding may be assigned a total weight that ranges from 0 to 24, which equates to a current consumption range of, e.g., 0 to 120 mA. The total weight for the data burst would be 0 if all the symbols in the data burst each encoded the bit pair (1,1), and the total weight for the data burst would be 24 if all the symbols in the data burst each encoded the bit pair (0,0). Data bursts comprising all 0's consume the most current, hence are the most expensive from a power consumption standpoint.

Figure 3:
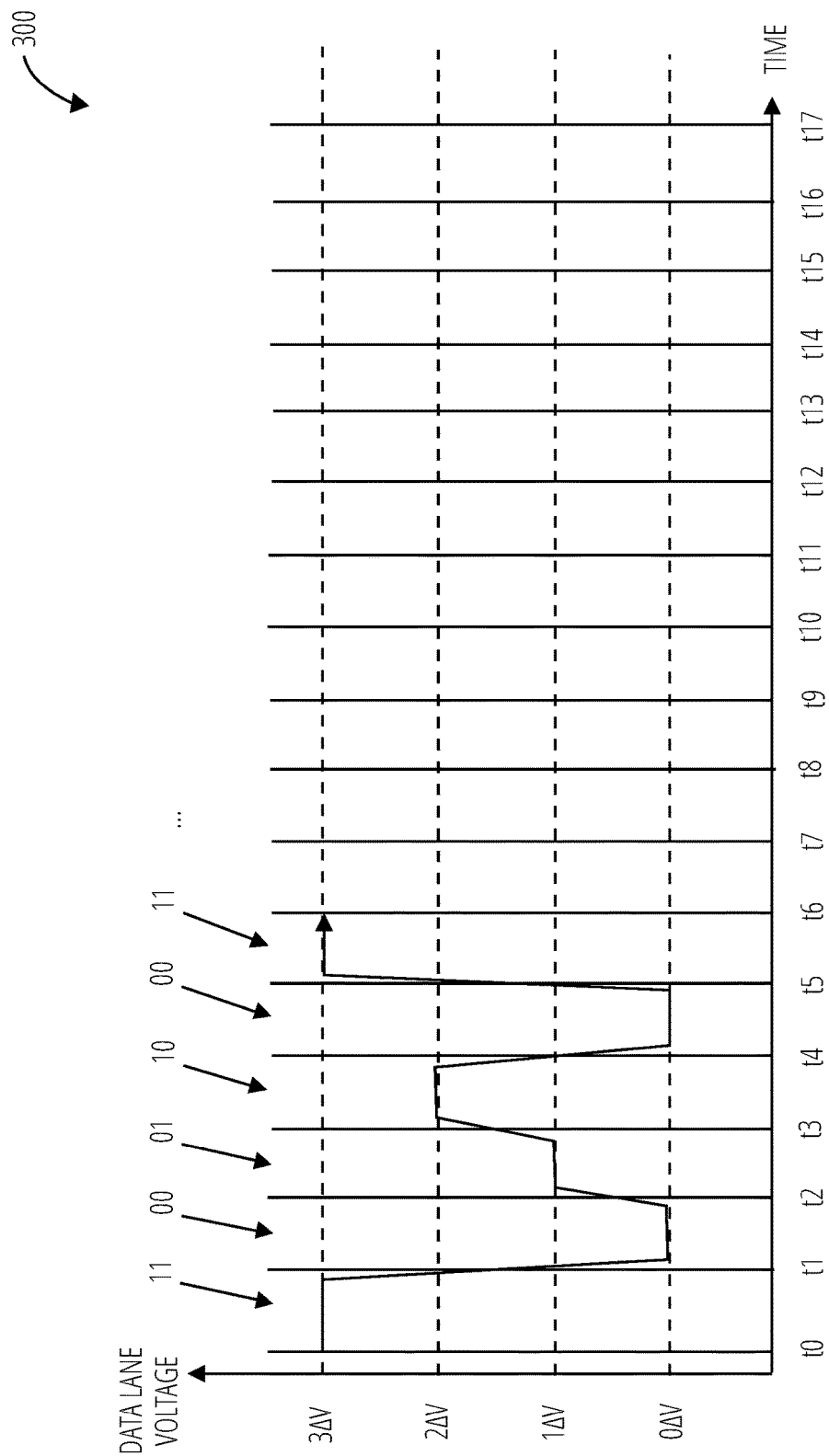
FIG. 3 illustrates an embodiment of a conventional PAM-4 data lane voltage waveform 300.

Referring to FIG. 3, a conventional PAM-4 data lane voltage waveform 300 encodes two bits of data on the data lane per clock interval by utilizing all 4-level symbols. An exemplary sequence of 12 bits is 110001100011. This sequence may be transferred as a series of four-level symbols each encoding two bits. For the bit sequence 110001100011, the bits 11 are encoded into the first serial data bus clock interval t0-t1; the next two bits 00 are encoded into the second serial data bus clock interval t1-t2; and so on. This results in two 3ΔV voltage level changes on the serial data bus from t0-t1 and from t4-t5.

The notation nΔV refers to a voltage change of n-deltas from the base voltage $V_b$ on a data lane of a serial data bus between clock intervals. For example, referring back to FIG. 2 in which different symbols have a 0.2V separation and the base voltage $V_b$ is 0.6V, a 3ΔV change would correspond to 3×0.2V or a 0.6V delta in voltage on the data lane between bus clock cycles.

Higher voltage deltas generate more noise because they lead to higher current swings in the data lane. Thus in FIG. 3 the 3ΔV deltas between bus clock intervals t0 and t1, and again between t4 and t5, may generate significant noise. Mitigating this maximum delta voltage activity helps to improve the SNR of a PAM-4 system such as the PAM-4 transceiver 200.

Figure 5:
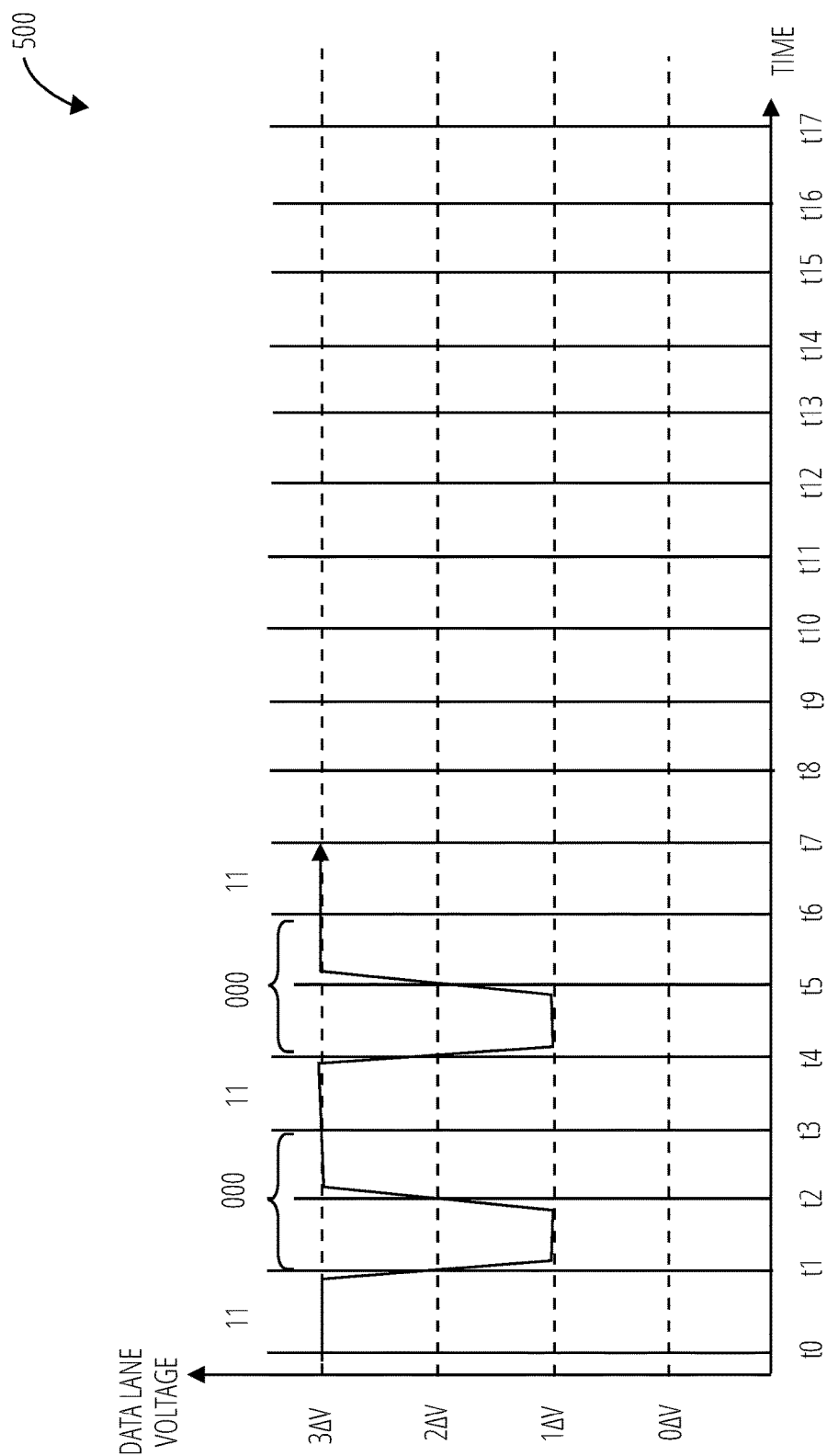
FIG. 5 illustrates an embodiment of a PAM-433 data lane voltage waveform 500.

A logic table for a PAM-433 encoder 400 in one embodiment is illustrated in FIG. 4. The PAM-433 encoder 400 eliminates 3ΔV voltage level changes on the serial data bus for the exemplary bit sequence 110001100011 discussed above. As shown in the logic table, when the 3-bit sequence 000 comes between two 2-bit sequences of the form 1x (where x is a "don't care" value of either 0 or 1), the 3-bit sequence 000 is encoded as the four bits 0111 (see first row of the logic table, third column). In other words, when the 3-bit sequence 000 bridges two 2-bit sequences that each have the most significant bit set (1x), the seven total bits are re-encoded as 1x01111x. In the example above where the seven total bits are 1100011, the re-encoded sequence is 11011111. Each 2-bit pair of this sequence is then transmitted as a PAM-4 symbol on the data lane of the serial data bus, resulting in the PAM-433 data lane voltage waveform 500 of FIG. 5. The 3ΔV voltage level changes in the sequence 110001100011 have been eliminated with use of a DBI line at the cost of one serial data bus clock cycle. In other words, the effective data transfer rate is reduced by 16.7% to 1.67 bits serial data bus clock interval on average assuming a randomly distributed bit sequence, compared to 2.0 bits per serial data bus clock interval for conventional PAM-4

The PAM-433 encoder 400 results in a 33% reduction in the worst-case voltage level switching on the data line over conventional PAM-4 encoders without necessitating the transmission of any metadata. The PAM-433 encoder 400 divides a sequence of bits to be transmitted on the data lane into sequences of five bits of data: the first two bits of each five bits are encoded into a symbol with four possible voltage levels and the last three bits of the five bits are encoded into two symbols each with three possible voltage levels.

In general, the above mechanisms may be applied to PAM-N (symbols utilizing N possible discrete voltage levels). For example, a PAM-866 scheme may transfer a 3-bit data symbol at the first transfer and a 5-bit data symbol over the following two transfers (2.67 bits-per-transfer, 11.1% overhead). PAM-866 may reduce the maximum voltage switching from 7ΔV (PAM-8) to 5ΔV (a 28.5% reduction). Furthermore, the mechanisms may be extended to other arbitrary combinations of data symbols (e.g., PAM-WXYZ) to achieve better reliability by leveraging similar mechanisms as PAM-433.

FIG. 6 to FIG. 9 depict various data lane voltage waveforms when PAM-433 encoding is utilized. Four data lane voltage waveforms are depicted for various different bit patterns to transmit on the data lane: data lane voltage waveforms 600, data lane voltage waveforms 700, data lane voltage waveforms 800, and data lane voltage waveforms 900.

Figure 6:
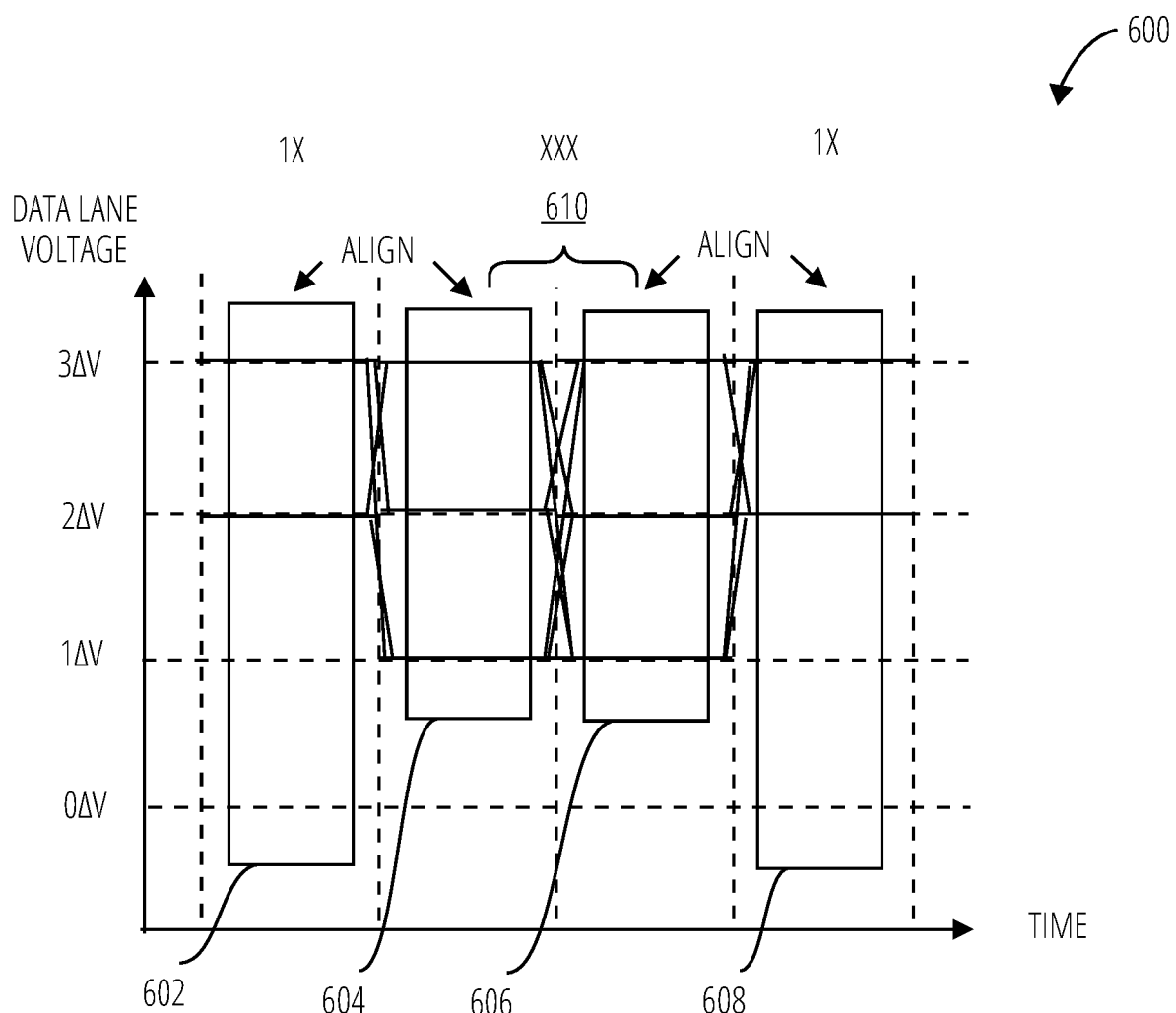
FIG. 6 illustrates an embodiment of a data lane voltage waveforms 600.
Figure 7:
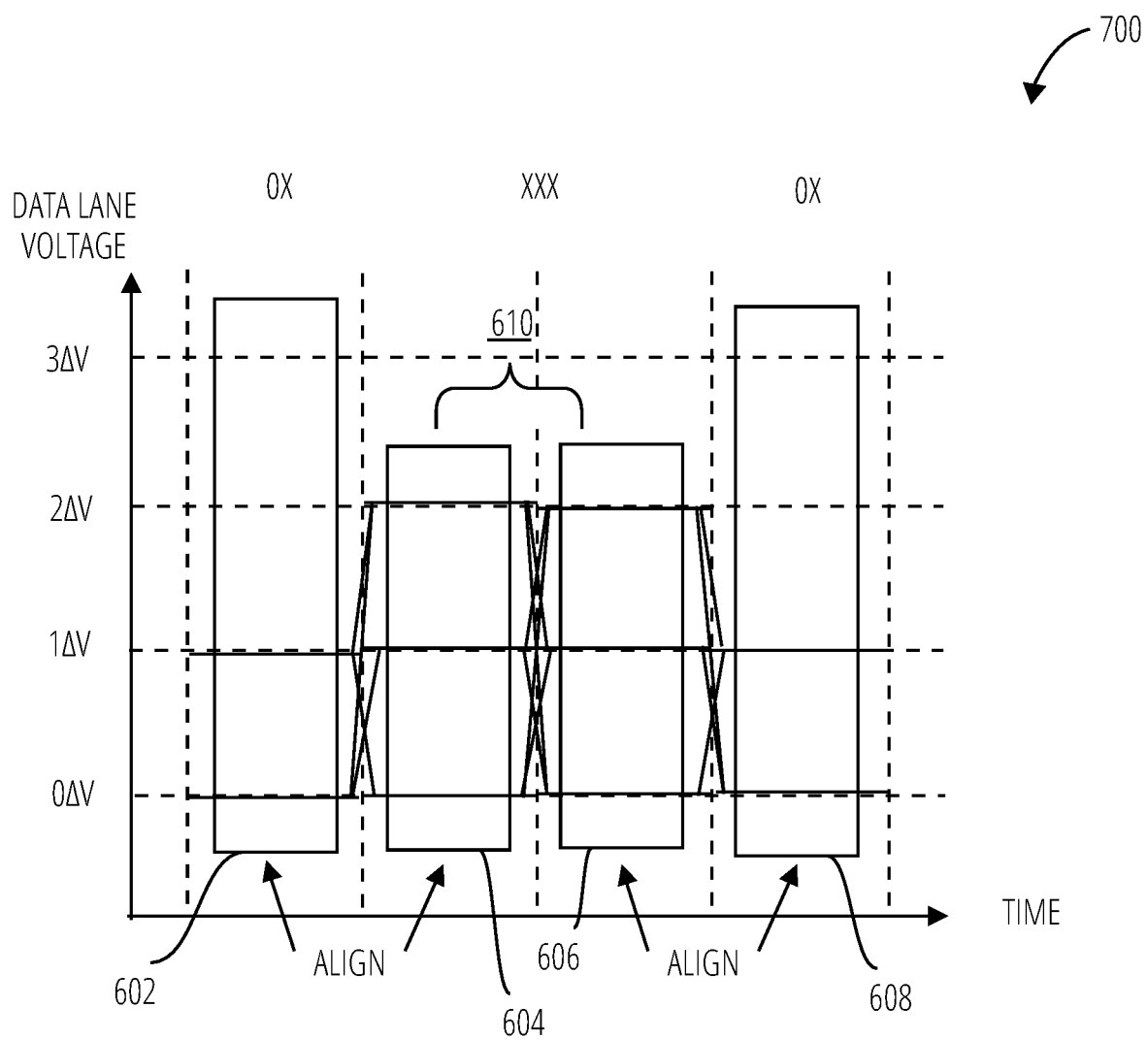
FIG. 7 illustrates an embodiment of a data lane voltage waveforms 700.

For the data lane waveforms depicted in FIG. 6 and FIG. 7, a first three-level symbol 604 and a second three-level symbol 606 are utilized as a "bridge 610" between a first four-level symbol 602 and a second four-level symbol 608 that have the same most significant bit (MSB). Examples that fit this pattern are pairs of four-level symbols such as: 11 (3ΔV)/10 (2ΔV) (FIG. 6) and 01 (1ΔV)/00 (0ΔV) (FIG. 7). The PAM-433 encoding aligns the voltage windows of the first three-level symbol 604 and the second three-level symbol 606 to the voltage level of the first four-level symbol 602 and the first three-level symbol 604 in such a way that the maximum voltage delta in the data lane voltage waveform is 2ΔV.

Figure 8:
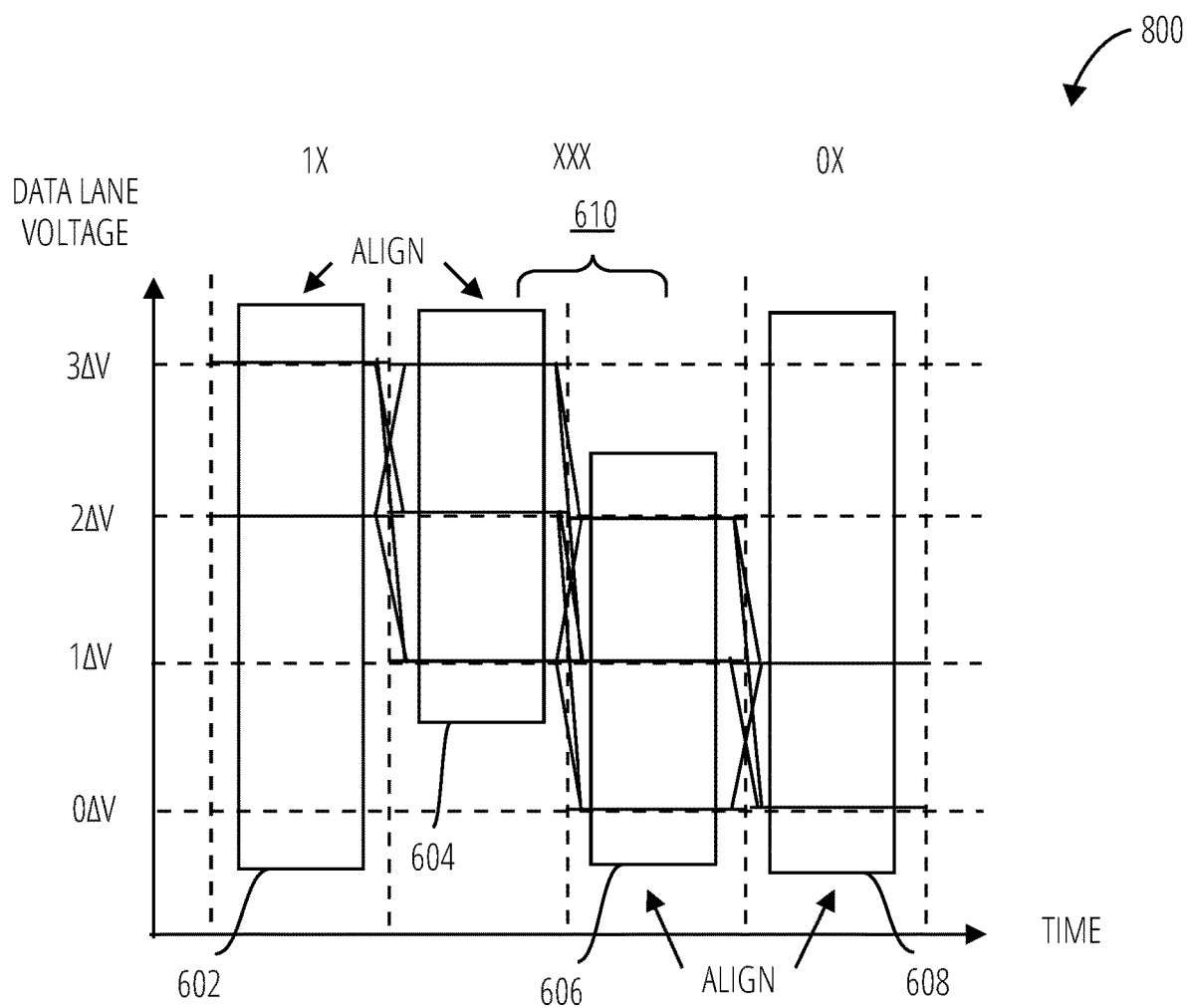
FIG. 8 illustrates an embodiment of a data lane voltage waveforms 800.
Figure 9:
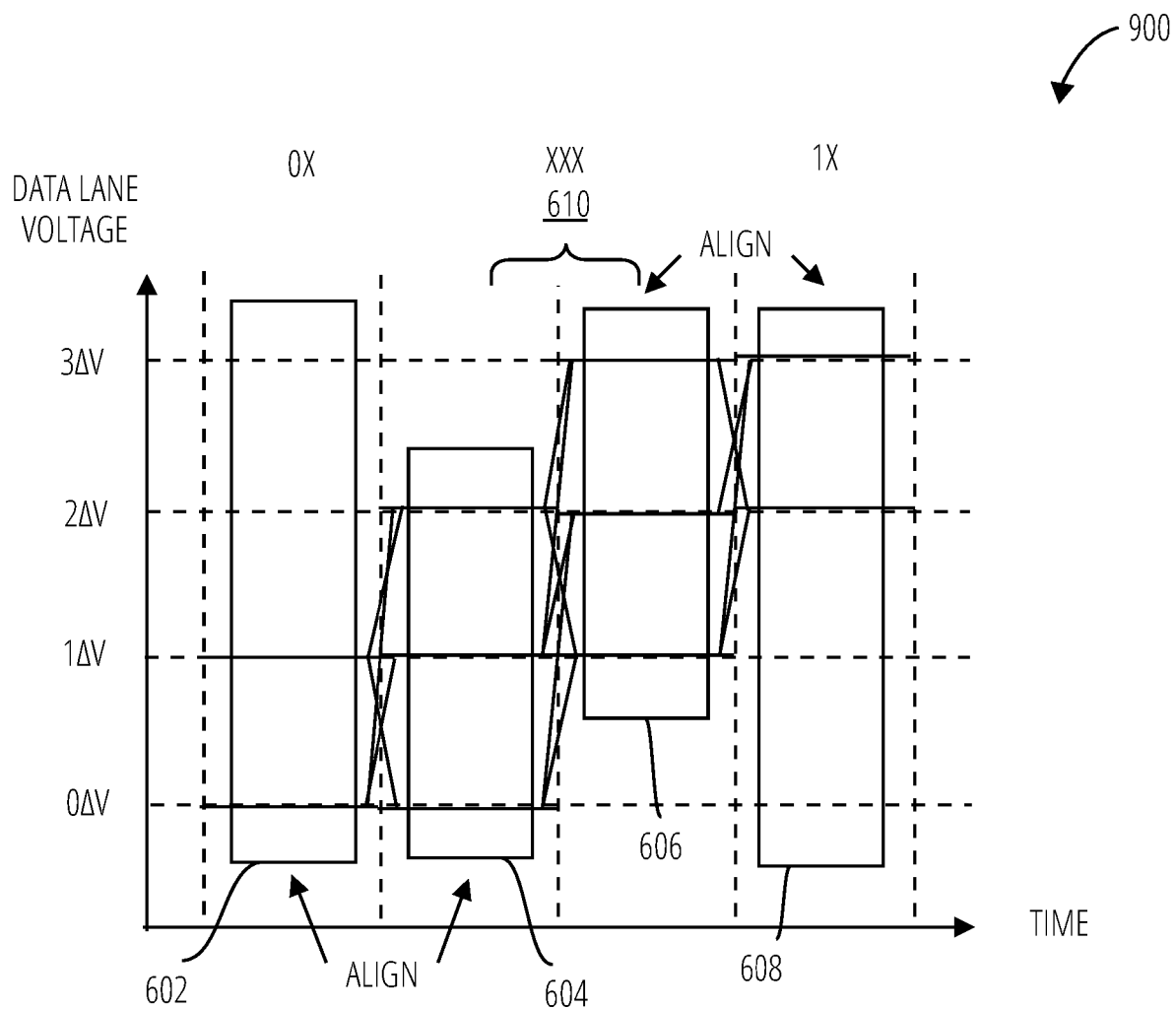
FIG. 9 illustrates an embodiment of a data lane voltage waveforms 900.

For the data lane waveforms depicted in FIG. 8 and FIG. 9, the first three-level symbol 604 and the second three-level symbol 606 are utilized as the bridge 610 between a first four-level symbol 602 and a second four-level symbol 608 that have different MSBs. A 3ΔV voltage delta is possible in this scenario between the first three-level symbol 604 and the second three-level symbol 606. However, the PAM-433 encoder 400 does not map the values that would cause this to happen in the logic table. The symbol that would cause a 3ΔV voltage delta between the three-level bursts is never used by the PAM-433 encoder 400, thus maintaining the maximum voltage delta in the data lane waveform at 2ΔV.

Figure 10:
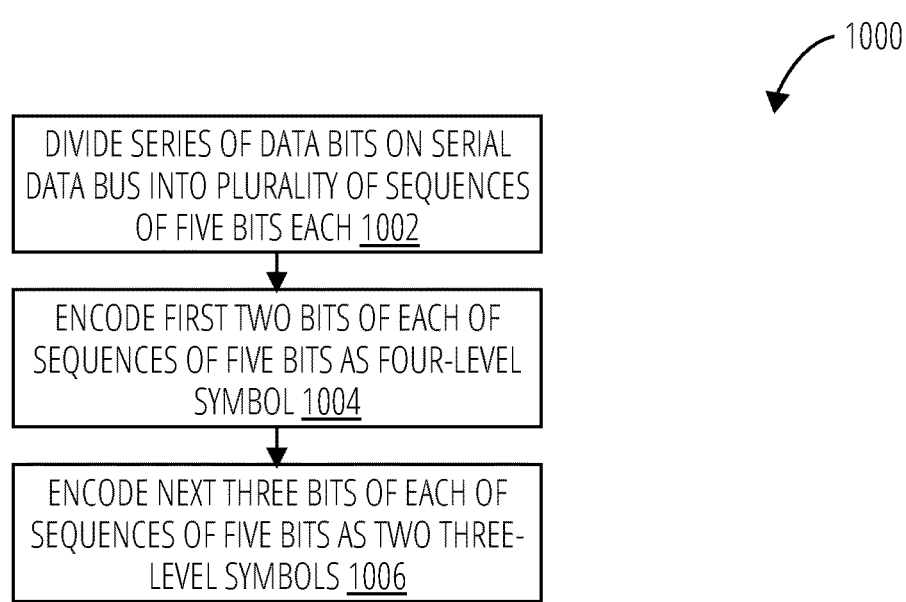
FIG. 10 illustrates an embodiment of a PAM-433 routine 1000.

Referring to FIG. 10, the PAM-433 routine 1000 in one embodiment divides a series of data bits on the serial data bus into a plurality of sequences of five bits each (block 1002). Next, the PAM-433 routine 1000 encodes a first two bits of each of the sequences of five bits as a four-level symbol (block 1004). Then, the PAM-433 routine 1000 encodes a next three bits of each of the sequences of five bits as two three-level symbols (block 1006). The PAM-433 routine 1000 may operate to encode symbols on one or more data lanes of a serial data bus.

In some embodiments, the two three-level symbols comprise a first three-level symbol and a second three-level symbol. The PAM-433 routine 1000 operates a serial data bus to encode a voltage level of the first three-level symbol as either (a) at most two voltage steps below a voltage level of the four-level symbol, or (b) at most two voltage steps above the voltage level of the four-level symbol. The sequences of five bits may also comprise a first sequence of five bits transmitted on the serial data bus, and a second sequence of five bits transmitted after the first sequence of five bits on the serial data bus. The PAM-433 routine 1000 may then operate the serial data bus to encode a voltage level of the second three-level symbol of the first sequence of five bits as either (a) at most two voltage steps below a voltage level of the four-level symbol of the second sequence of five bits, or (b) at most two voltage steps above the voltage level of the four-level symbol of the second sequence of five bits.

Figure 11:
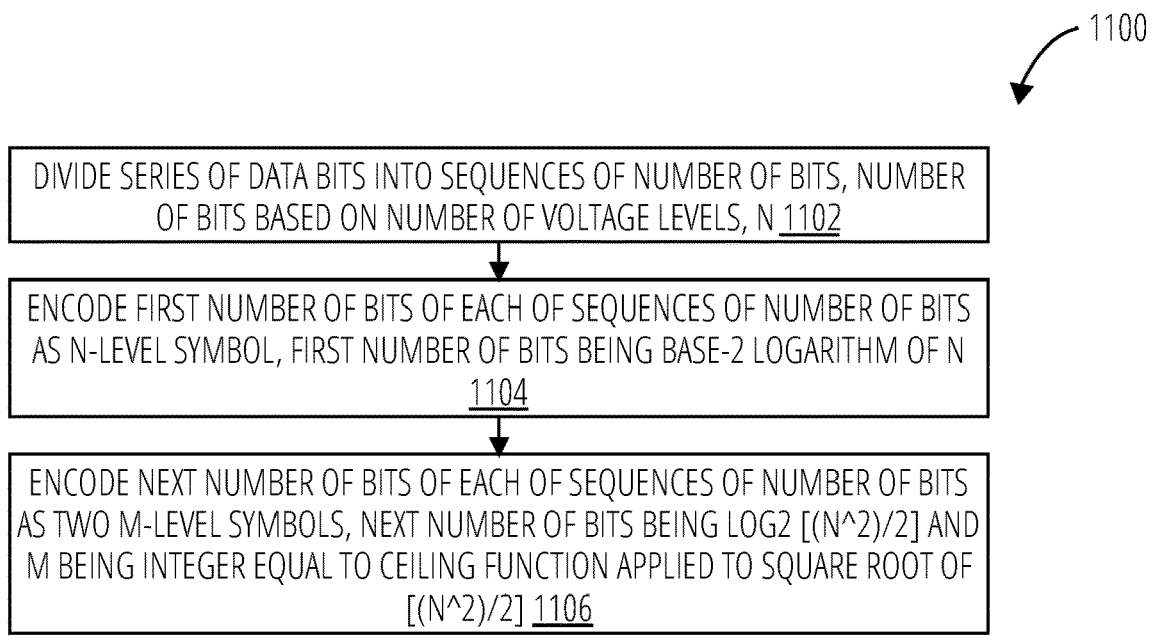
FIG. 11 illustrates an embodiment of a PAM-N routine 1100.

Referring to FIG. 11, a more general PAM-N routine 1100 divides the series of data bits into sequences of a number of bits, the number of bits based on a number of voltage levels, N (block 1102). Next, the PAM-N routine 1100 encodes a first number of bits of each of the sequences of a number of bits as an N-level burst, the first number of bits being the base-2 logarithm of N (block 1104). Then, the PAM-N routine 1100 encodes a next number of bits of each of the sequences of a number of bits as two M-level bursts, the next number of bits being log 2 [(N^2)/2] and M being an integer equal to a ceiling function applied to a square root of [(N^2)/2] (block 1106). The PAM-N routine 1100 may operate to communicate data over a serial data bus.

Figure 12:
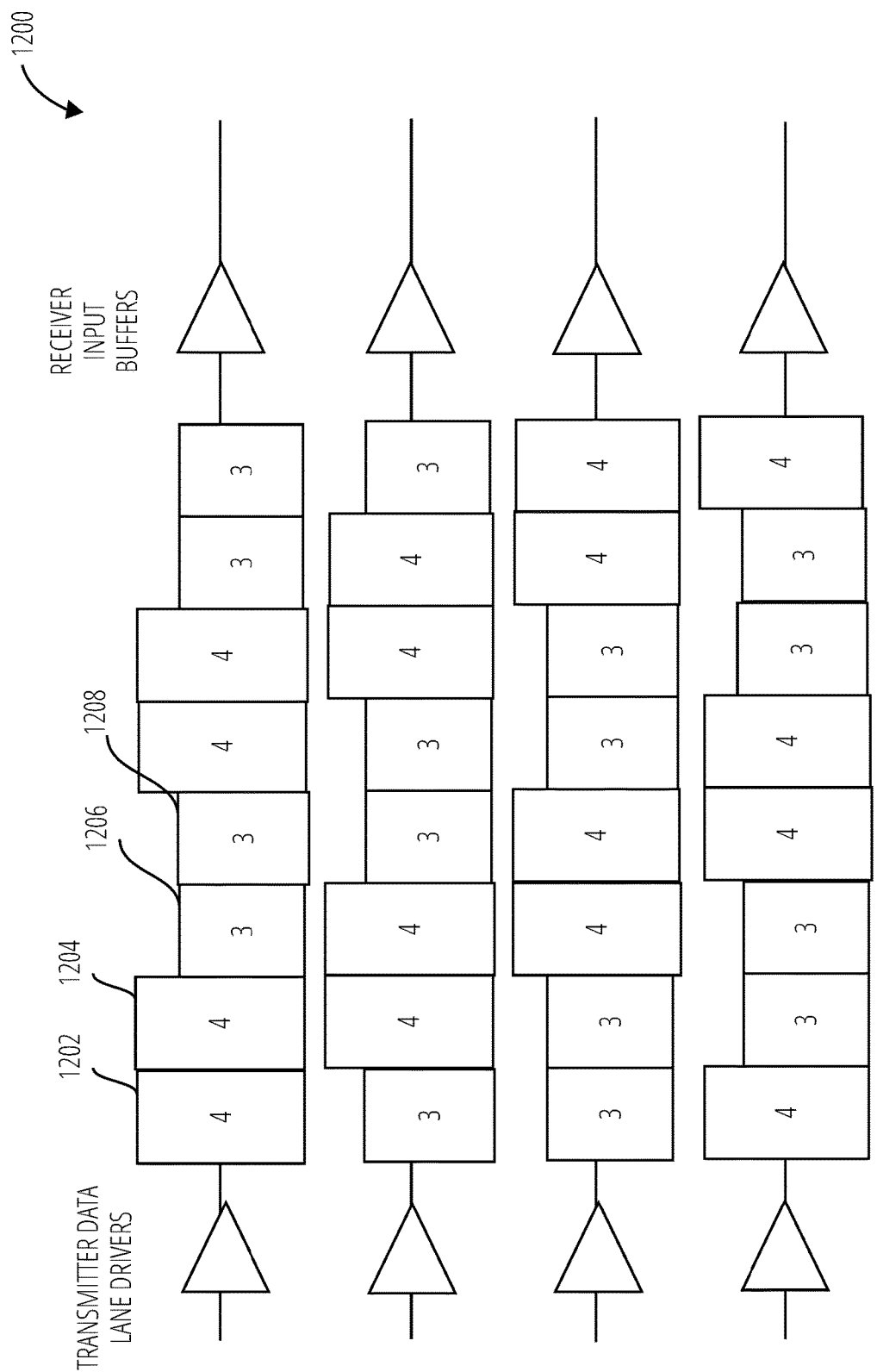
FIG. 12 illustrates an embodiment of a PAM-4433 encoding 1200.

Referring to FIG. 12, a PAM-4433 encoding 1200 embodiment is illustrated. The PAM-4433 encoding 1200 operates a serial data bus to encode and transfer a 7-bit data word using a sequence of a first four-level symbol 1202, a second four-level symbol 1204, a first three-level symbol 1206, and a second three-level symbol 1208. As a result, it is possible for 3ΔV voltage delta to occur on a particular data lane between two four-level symbols, such as the first four-level symbol 1202 and the second four-level symbol 1204. However, as FIG. 12 depicts, the potential 3ΔV voltage deltas may be staggered across multiple data lanes, reducing the maximum voltage delta in any particular data burst (all bits sent over the serial data bus during one clock interval). Multiple 3ΔV voltage deltas do not occur in the same data burst, reducing crosstalk and other noise sources. This PAM-4433 encoding 1200 has a 12.5% bandwidth cost (1.75 bits-per-transfer) while having a maximum average 2.25ΔV maximum voltage delta over the four data lanes in this example (other numbers of data lanes may of course be used in other embodiments).

Figure 13:
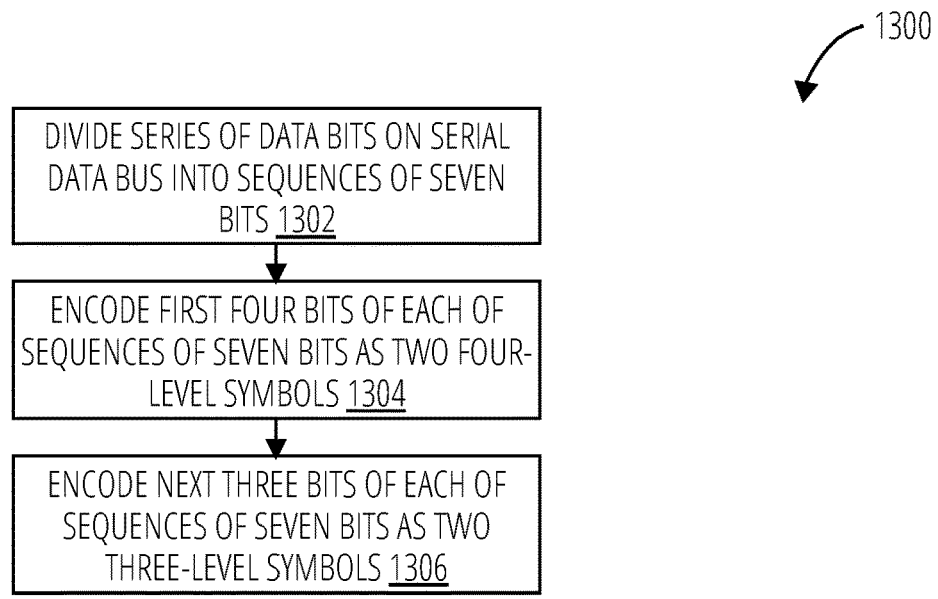
FIG. 13 illustrates an embodiment of a PAM-4433 routine 1300.

Referring to FIG. 13, an embodiment of a PAM-4433 routine 1300 divides a series of data bits to be transmitted on the data lane of a serial data bus into sequences of seven bits (block 1302). Next, the PAM-4433 routine 1300 encodes a first four bits of each of the sequences of seven bits as two four-level symbols (block 1304). Then, the PAM-4433 routine 1300 encodes a next three bits of each of the sequences of seven bits as two three-level symbols (block 1306). This is repeated for across multiple data lanes of a serial data bus and the transitions between four-level symbols may then be staggered in time (aligned on different serial data bus clock intervals) across the data lanes.

Figure 14:
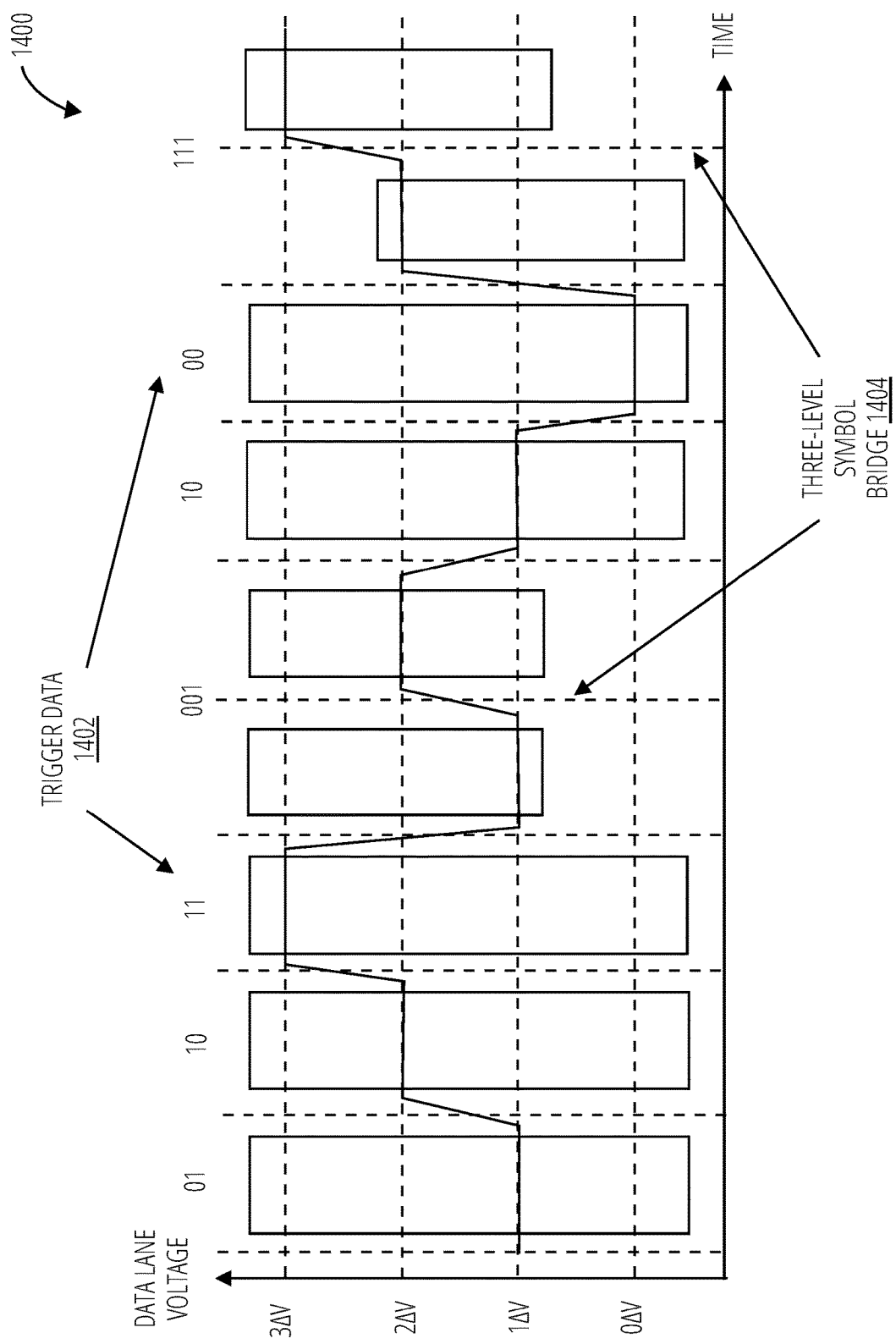
FIG. 14 illustrates an embodiment of a variable PAM-433 encoding 1400.

Referring to FIG. 14, a variable PAM-433 encoding 1400 in one embodiment activates PAM-433 encoding if the current symbol corresponds to a data lane voltage of either 0ΔV or 3ΔV. This is referred to as "trigger data 1402" to activate PAM-433 encoding. Upon encountering the trigger data 1402, an appropriate three-level symbol bridge 1404 is utilized after the trigger data. Otherwise if the trigger data is not encountered, the variable PAM-433 encoding 1400 utilizes conventional PAM-4 encoding (all symbols are four-level). The variable PAM-433 encoding 1400 results in a maximum voltage delta of 2ΔV in the serial data bus data lane voltage waveform.

Figure 15:
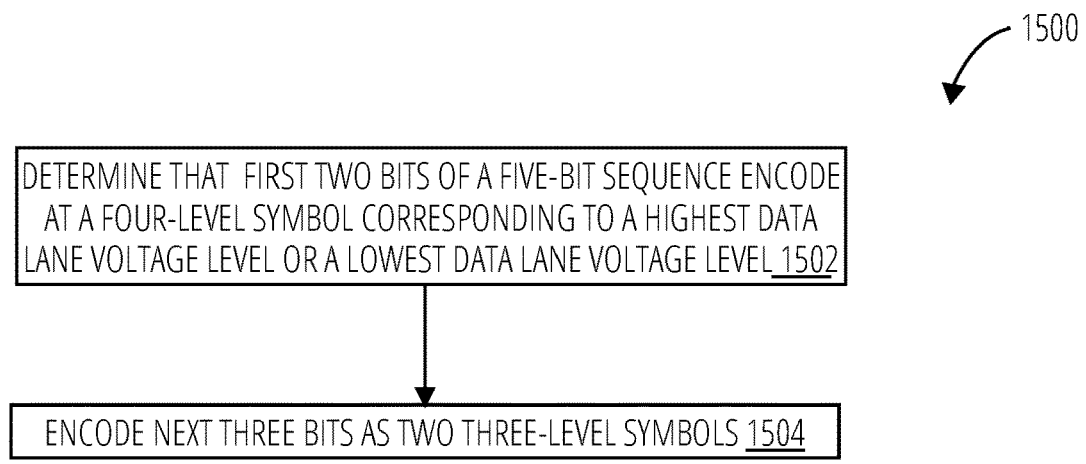
FIG. 15 illustrates an embodiment of a variable PAM-433 routine 1500.

Referring to FIG. 15, a variable PAM-433 routine 1500 determines that a first two bits of sequences of five bits encode to a four-level symbol corresponding to a highest voltage level or a lowest voltage level utilized on a data lane of a serial data bus (block 1502). In other words, the trigger data is encountered. In response to encountering the trigger data, the variable PAM-433 routine 1500 encodes a next three bits of the sequences of five bits as two three-level symbols (block 1504).

Figure 16:
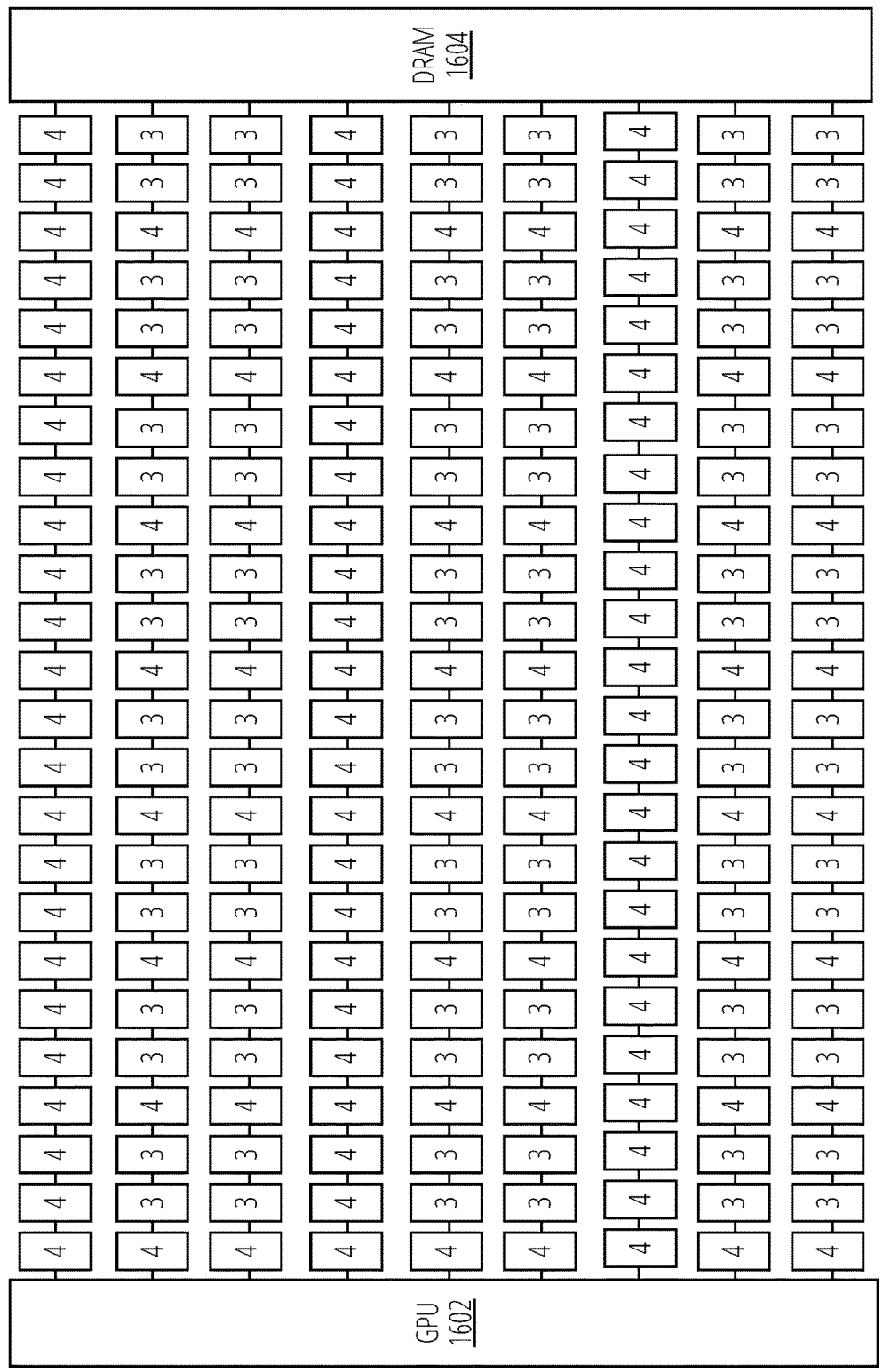
FIG. 16 illustrates an embodiment of relaxed PAM-433 1600.

FIG. 16 illustrates an embodiment of relaxed PAM-433 1600, which has two different data transfer configurations on a multi-data lane interface. Data is transferred from the GPU 1602 to the DRAM 1604 on nine data lanes. Switching activity constraint is relaxed from "no 3ΔV switching at all" in PAM-433 to "only one 3ΔV switching within 3 adjacent data lanes at most".

The configuration of the relaxed PAM-433 1600 utilizes three-data lane groups, each of which comprises one PAM-4 data lane and two PAM-433 data lanes. As a result, within the three-data lane group, only one data lane (PAM-4)

experiences 3ΔV switching. Each of the three-data lane groups is then arranged to ensure that the one PAM-4 data lane is three data lanes away from the PAM-4 data lane in another three-data lane group. As depicted in FIG. 16, the data lane configuration (from top to bottom) is PAM-4, PAM-433, PAM-433, PAM-4, PAM-433, PAM-433, PAM-4, PAM-433, and PAM-433. Other configurations may also result in the PAM-4 data lanes being at least three data lanes from another PAM-4 data lane. For example, PAM-433, PAM-4, PAM-433, PAM-433, PAM-4, PAM-433, PAM-433, PAM-4, and PAM-433 may be a utilized configuration.

In a conventional PAM-2 interface, a group of eight data lanes is associated with one DBI lane that transfers the control signal for DBI and one electronic data capture (EDC) data lane that communicates cyclic redundancy check (CRC) information of data. In some embodiments these two lanes may be utilized for transferring PAM-433 encoded data. Implementations of "relaxed" PAM-433 communication may be implemented on 9-data lane systems and 10-data lane systems, for example (the DBI lane being used as one of the data lanes).

To implement the relaxed PAM-433 1600 in a memory system (or most multi-data lane busses, generally), it is desirable to consider the boundary of requests (e.g., 128-bit requests common in GDDR or HBM memories). In this environment, it may be simpler for the controllers to consider each request independently. However, it is difficult to send just 128 bits in a burst of eight symbols on nine data lanes. The encoding may send 384 bits in 24 symbols on the nine data lanes, such that, over a series of consecutive transfers, the data may be efficiently encoded. However, there is no simple symbol boundary across all the data lanes where a 128-bit request ends and the next begins. A controller can keep track of these sorts of issues and support "post-ambles" with an extra symbol of data in the case of sending only one or two consecutive 128-bit transfers (or any non-multiple of three transfers). It is however more complex for the transmitter and receiver logic to implement these sorts of behaviors.

Figure 17:
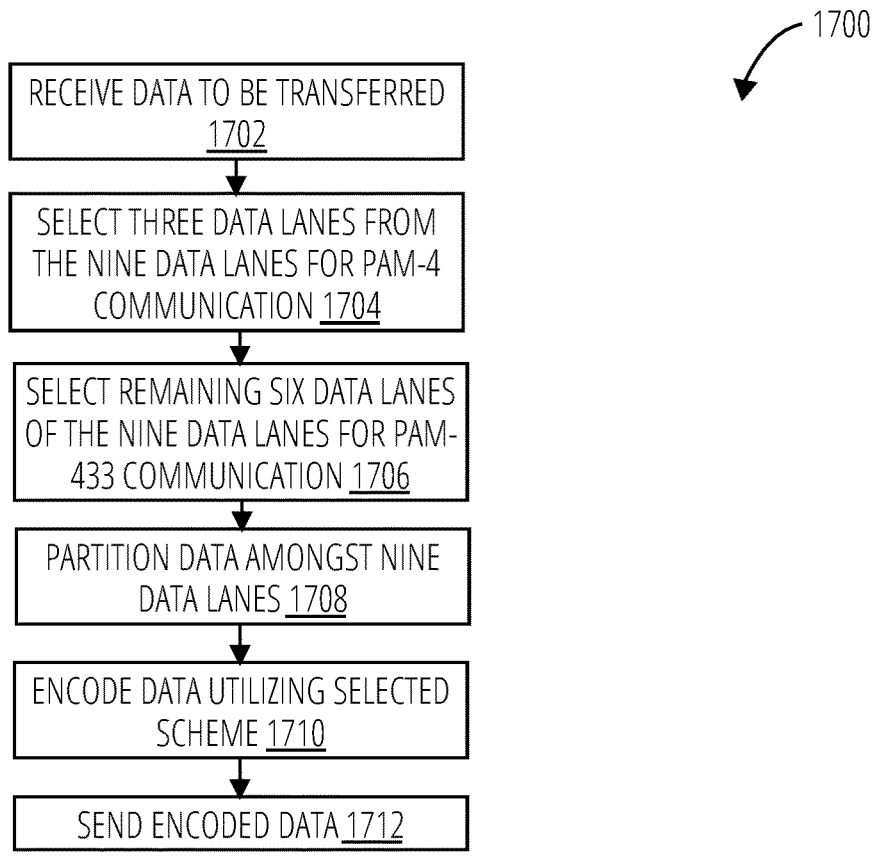
FIG. 17 illustrates a relaxed PAM-433 encoding method 1700 in accordance with one embodiment.

Referring to FIG. 17, a relaxed PAM-433 encoding method 1700 receives data to be sent across a serial data bus (block 1702). The data may be 128 bits; however, 384 bits (three consecutive 128-bit bursts) may be more efficiently transferred with the relaxed PAM-433 encoding method 1700. Three data lanes are selected from the nine data lanes to be PAM-4 data lanes (block 1704). PAM-4 data lanes utilize 4-level symbols to encode the received data. Thus, these data lanes may have 3ΔV switching. To reduce the effects of 3ΔV switching, the three selected data lanes for PAM-4 encoding are separated from each other. They may be separated such that every three data lanes is a PAM-4 data lane. Therefore, there are at least two data lanes without PAM-4 encoding between the data lanes with PAM-4 encoding. For example, the 1st, 4th, and 7th data lanes may be selected as PAM-4 data lanes. Alternatively, the 2nd, 5th, and 8th data lanes may be selected or the 3rd, 6th, and 9th data lanes may be selected. The remaining six data lanes of the nine data lanes are then selected to be PAM-433 data lanes (block 1706). PAM-433 data lanes utilize sets of a 4-level symbol and two 3-level symbols to encode the received data. The data is then partitioned amongst the nine data lanes (block 1708). As PAM-4 is more efficient than PAM-433, each PAM-4 data lane receives more data to be transferred. For example, for a 384-bit transfer, each PAM-4 data lane receives 48 bits to encode and transfer. Each PAM-433 data lane receives 40 bits to encode and transfer. One separation scheme has the 1st, 4th, and 7th data lanes as PAM-4 data lanes. The first 48 bits may be sent along the 1st data lane, the next 40 bits along the 2nd data lane, the next 40 bits along the third data lane, and then repeat for the 4th-6th data lanes, and the 7th-9th data lanes. The data is encoded utilizing selected scheme (block 1710) and then sent (block 1712).

In some embodiments, the relaxed PAM-433 encoding method 1700 may operate as a pure PAM-4 communication system (all data lanes using PAM-4 communications) until a threshold number of three voltage level switches (or transitions) occurs or if the encoder determines that the threshold number of three voltage level switches is to occur, at which point some of the data lanes are switched over to PAM-433 communications.

Figure 18:
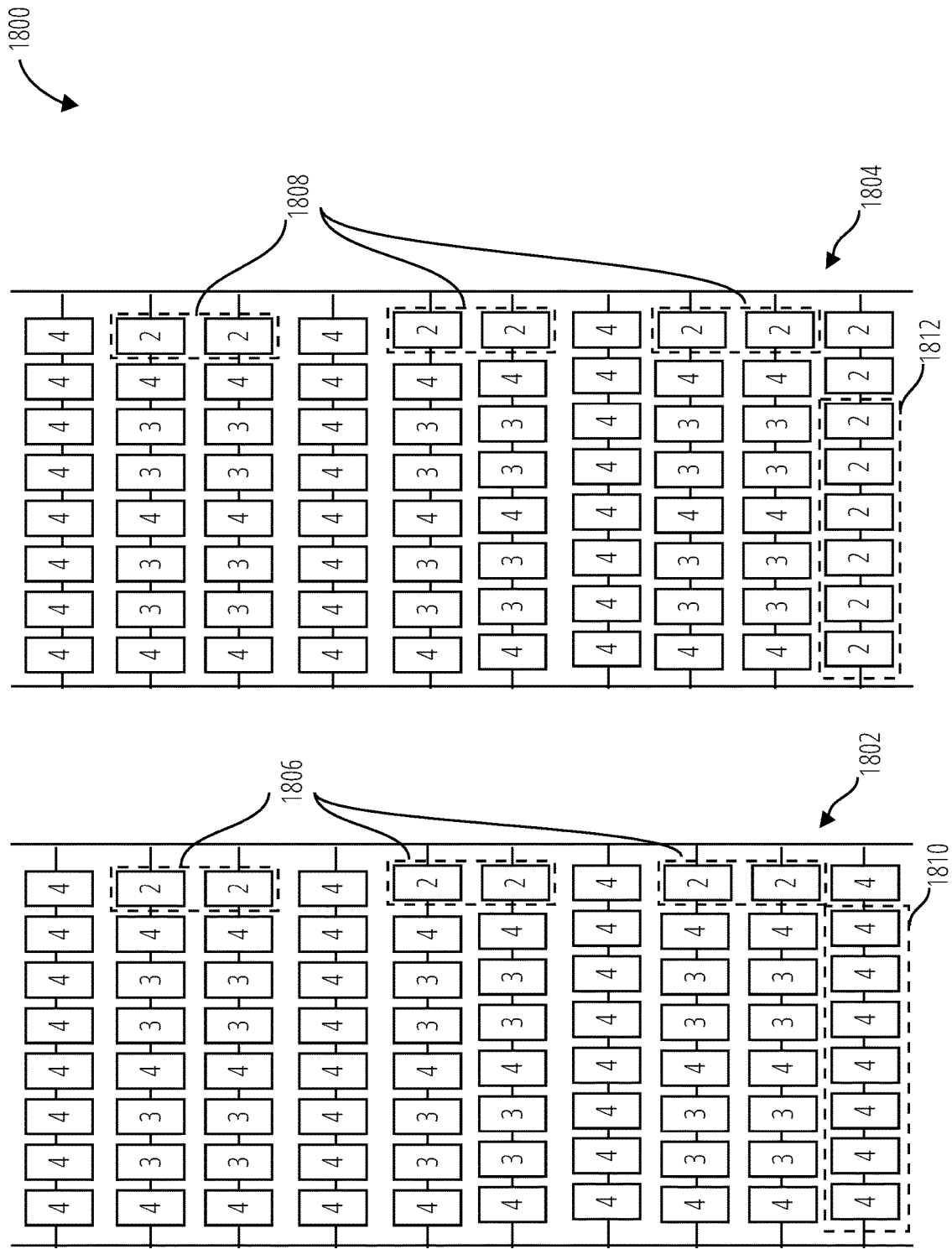
FIG. 18 illustrates an embodiment of relaxed PAM-433 1800.

FIG. 18 illustrates other embodiments of relaxed PAM-433 1800 for a 142-bit request 1802 and a 134-bit request 1804. The 142-bit request 1802 includes 128 bits of data and a 14-bit CRC 1810. The CRC 1810 is seven of eight symbols of the 10th data lane. The 134-bit request 1804 includes 128 bits of data and a 6-bit CRC 1812. The CRC 1812 is six of eight symbols of the 10th data lane. The transfer for the 142-bit request 1802 ends with a two-level symbol 1806 for the data lanes utilizing a PAM-433 scheme; likewise, the transfer for the 134-bit request 1804 ends with a two-level symbol 1808 for the data lanes utilizing a PAM-433 scheme.

The two-level symbol 1806 and the two-level symbol 1808 may utilize the middle two levels (L1/L2) of PAM-4, as, at the request boundary, the next symbol is a 4-level symbol with a value that may be 0ΔV-3ΔV. Because the final symbol utilizes the middle two levels (L1/L2), this results in no 3ΔV switching (maximum of 2ΔV) at the request boundary. The CRC 1812 of the 134-bit request 1804 uses only two levels (e.g. L1/L3) of PAM-4, which enables higher reliability for CRC information.

The relaxed PAM-433 1800 provides efficient 128-bit transfers while also enabling additional data for a CRC to detect transmission errors. In this environment, the controllers may consider each 128-bit transfer independently. Adding a two-level one-bit symbol at the end of each request inhibits any 3ΔV switching between two consecutive request transfers.

In GDDR6 memories the "EDC" signal that transmits the CRC data may operate in DDR (double-data rate) or in a more reliable SDR (single-data rate) mode. The 10th data lane that carries the CRC data (and 2 bits of data payload) may be operated in a more reliable manner by sending only two symbols (e.g., either L1 and L3) on each transfer. This improves signal to noise and thus reliability, but reduces the number of CRC bits from 14 to 6.

Figure 19:
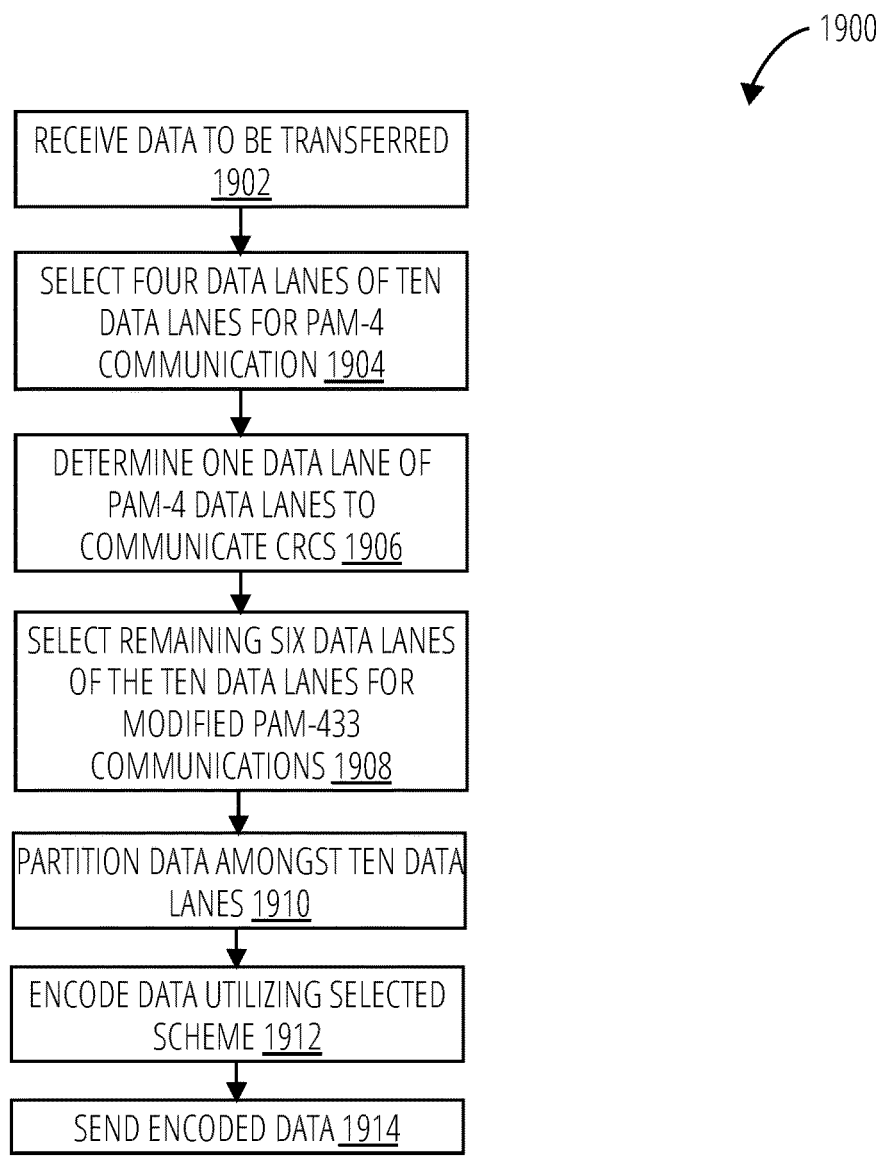
FIG. 19 illustrates a relaxed PAM-433 encoding method 1900 in accordance with one embodiment.

Referring to FIG. 19, a relaxed PAM-433 encoding method 1900 receives data to be transferred (block 1902). The received data may be 142 bits, including 128 data bits and a 14-bit CRC. The relaxed PAM-433 encoding method 1900 utilizes ten data lanes to transfer data. Four data lanes of ten data lanes are selected to be PAM-4 data lanes (block 1904). PAM-4 data lanes utilize 4-level symbols to encode the received data. Thus, these data lanes may have 3ΔV switching. To reduce the effects of 3ΔV switching, the four selected data lanes for PAM-4 encoding are separated from each other. They may be separated such that every three data lanes is a PAM-4 data lane. Therefore, there are at least two data lanes without PAM-4 encoding between the data lanes with PAM-4 encoding. For example, the 1st, 4th, 7th, and 10th data lanes may be selected for example as depicted for the 142-bit request 1802). One data lane of the PAM-4 data lanes is determined to be the dedicated CRC data lane (block 1906). The CRC data lane transmits the 14-bit CRC as seven of eight data symbols, as well as two data bits as one of the eight data symbols. The remaining six data lanes of the ten data lanes are selected to be modified PAM-433 data lanes (block 1908). Modified PAM-433 data lanes utilize two sets of a 4-level symbol and two 3-level symbols and one set of a 4-level symbol and a 2-level symbol to encode the received data. The data is then separated amongst ten data lanes (block 1910). As PAM-4 is more efficient than modified PAM-433, each PAM-4 data lane receives more data to be transferred. For example, for the 142 bit 142-bit transfer, each PAM-4 data lane receives 16 bits to encode and transfer (the CRC data lane receiving the 14-bit CRC as well as two data bits). Each modified PAM-433 data lane receives 13 bits to encode and transfer. One separation scheme has the 1st, 4th, 7th, and 10th data lanes as PAM-4 data lanes (with the 10th as the CRC data lane) and the other data lanes as modified PAM-433 data lanes. The data is encoded utilizing the selected scheme (block 1912) and then sent (block 1914).

In some embodiments, the relaxed PAM-433 encoding method 1900 may operate as a pure PAM-4 system until a threshold number of three voltage level switches (or transitions) occurs or if the encoder determines that the threshold number of three voltage level switches is to occur.

Figure 20:
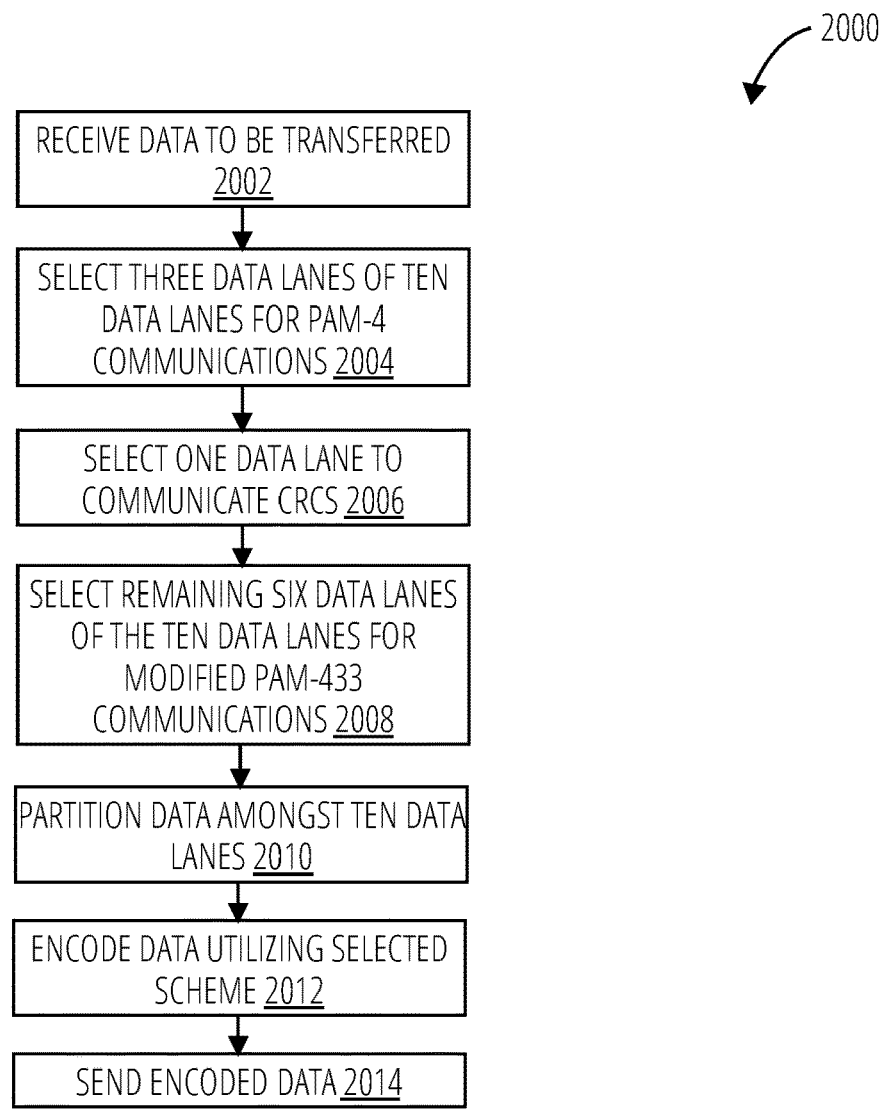
FIG. 20 illustrates a relaxed PAM-433 encoding method 2000 in accordance with one embodiment.

Referring to FIG. 20, a relaxed PAM-433 encoding method 2000 receives data to be transferred (block 2002). The received data may be 134 bits, including 128 data bits and a 6-bit CRC. The relaxed PAM-433 encoding method 2000 utilizes ten data lanes to transfer data. Three data lanes of ten data lanes are selected to be PAM-4 data lanes (block 2004). PAM-4 data lanes utilize 4-level symbols to encode the received data. Thus, these data lanes may have 3ΔV switching. To reduce the effects of 3ΔV switching, the three selected data lanes for PAM-4 encoding are separated from each other. They may be separated such that every three data lanes is a PAM-4 data lane. Therefore, there are at least two data lanes without PAM-4 encoding between the data lanes with PAM-4 encoding. For example, the 1st, 4th, and 7th data lanes may be selected for as depicted for the 134-bit request 1804). One data lane is then selected to be the CRC data lane (block 2006). The CRC data lane transmits eight 2-level data symbols for eight total bits transferred per burst. The CRC data lane transmits the 6-bit CRC as six of eight data symbols, as well as two data bits as two of the eight data symbols. The remaining six data lanes of the ten data lanes are selected to be modified PAM-433 data lanes (block 2008). Modified PAM-433 data lanes utilize two sets of a 4-level symbol and two 3-level symbols and one set of a 4-level symbol and a 2-level symbol to encode the received data. The data is then separated amongst ten data lanes (block 2010). As PAM-4 is more efficient than modified PAM-433, each PAM-4 data lane receives more data to be transferred. For example, for the 134-bit transfer, each PAM-4 data lane receives 16 bits to encode and transfer. Each modified PAM-433 data lane receives 13 bits to encode and transfer. The CRC data lane receives the 14-bit CRC and two data bits to transfer. One separation scheme has the 1st, 4th, and 7th data lanes as PAM-4 data lanes, the 10th as the CRC data lane, and the other data lanes as modified PAM-433 data lanes. The data is encoded utilizing selected scheme (block 2012) and then sent (block 2014).

In some embodiments, the relaxed PAM-433 encoding method 2000 may operate as a pure PAM-4 system until a threshold number of three voltage level switches (or transitions) occurs or if the encoder determines that the threshold number of three voltage level switches is to occur.

Figure 21:
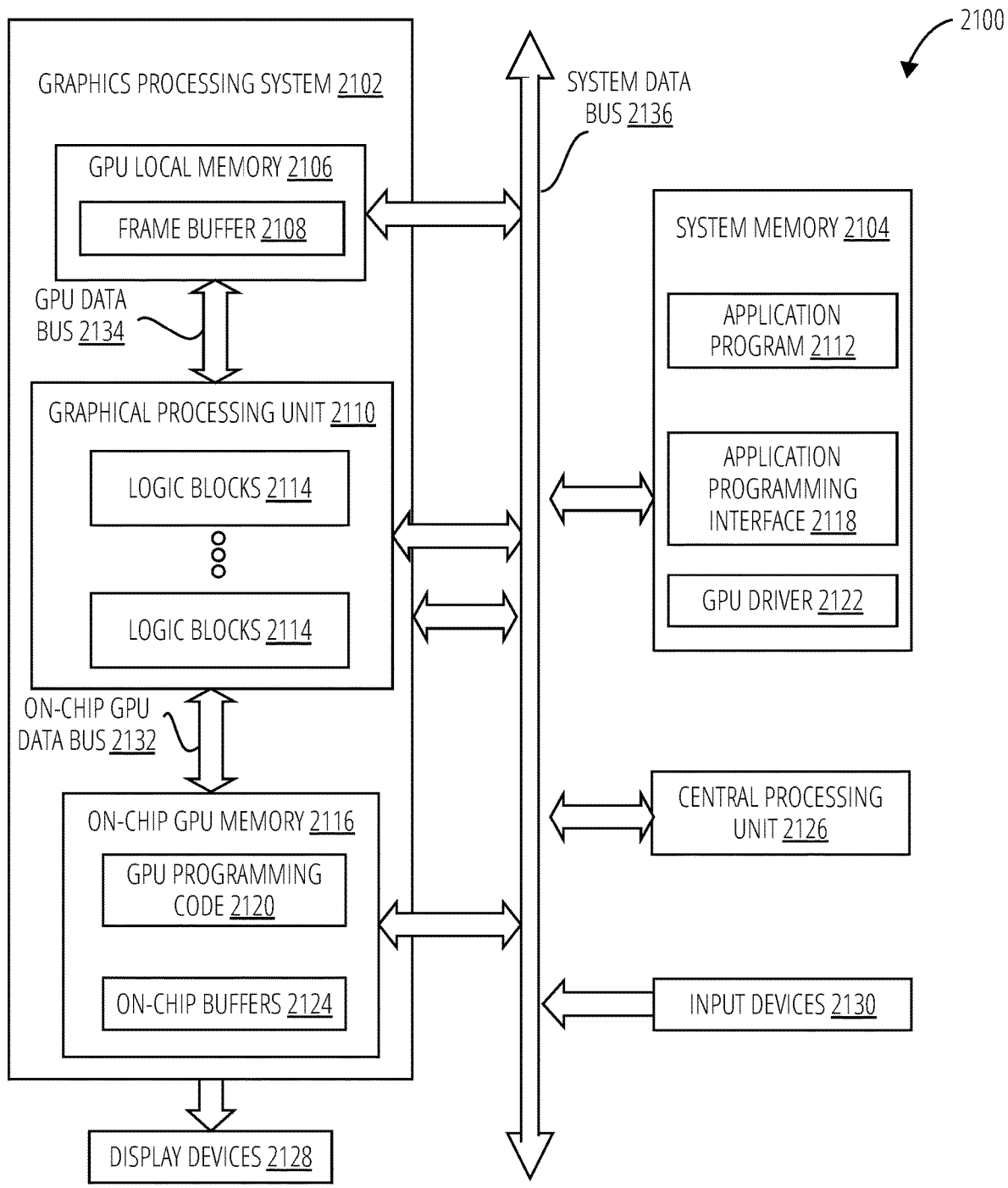
FIG. 21 is a block diagram of a computing system 2100 including a GPU in which aspects of the invention may be embodied or carried out.

FIG. 21 is a block diagram of one embodiment of a computing system 2100 in which one or more aspects of the invention may be implemented. The computing system 2100 includes a system data bus 2136, a CPU 2126, input devices 2130, a system memory 2104, a graphics processing system 2102, and display devices 2128. In alternate embodiments, the CPU 2126, portions of the graphics processing system 2102, the system data bus 2136, or any combination thereof, may be integrated into a single processing unit. Further, the functionality of the graphics processing system 2102 may be included in a chipset or in some other type of special purpose processing unit or co-processor.

As shown, the system data bus 2136 connects the CPU 2126, the input devices 2130, the system memory 2104, and the graphics processing system 2102. In alternate embodiments, the system memory 2104 may connect directly to the CPU 2126. The CPU 2126 receives user input from the input devices 2130, executes programming instructions stored in the system memory 2104, operates on data stored in the system memory 2104, and configures the graphics processing system 2102 to perform specific tasks in the graphics pipeline. The system memory 2104 typically includes dynamic random access memory (DRAM) employed to store programming instructions and data for processing by the CPU 2126 and the graphics processing system 2102. The graphics processing system 2102 receives instructions transmitted by the CPU 2126 and processes the instructions to perform various operations inside the computing system 2100.

As also shown, the system memory 2104 includes an application program 2112, an API 2118 (application programming interface), and a graphics processing unit driver 2122 (GPU driver). The application program 2112 generates calls to the API 2118 to produce a desired set of results. For example the application program 2112 also transmits programs to the API 2118 to perform shading operations, artificial intelligence operations, or graphics rendering operations. The API 2118 functionality may be typically implemented within the graphics processing unit driver 2122. The graphics processing unit driver 2122 is configured to translate the high-level shading programs into machine code.

The graphics processing system 2102 includes a GPU 2110 (graphics processing unit), an on-chip GPU memory 2116, an on-chip GPU data bus 2132, a GPU local memory 2106, and a GPU data bus 2134. The GPU 2110 is configured to communicate with the on-chip GPU memory 2116 via the on-chip GPU data bus 2132 and with the GPU local memory 2106 via the GPU data bus 2134. The GPU data bus 2134 may utilized one or more of the encoding techniques described herein.

The GPU 2110 may receive instructions transmitted by the CPU 2126 and store results in the GPU local memory 2106. Subsequently, if the instructions were graphics instructions, the GPU 2110 may display certain graphics images stored in the GPU local memory 2106 on the display devices 2128.

The GPU 2110 includes one or more logic blocks 2114. The operation of the logic blocks 2114 may implement embodiments of the encoding schemes described herein. The logic blocks 2114 may be loaded on the GPU as instructions or may be implemented in circuitry as instruction set architecture features, or a combination of both of these.

The GPU 2110 may be provided with any amount of on-chip GPU memory 2116 and GPU local memory 2106, including none, and may employ on-chip GPU memory 2116, GPU local memory 2106, and system memory 2104 in any combination for memory operations. The data/instruction busses between these memories and the GPU 2110 may utilize one or more of the encoding techniques described herein.

The on-chip GPU memory 2116 is configured to include GPU programming 2120 and on-Chip Buffers 2124. The GPU programming 2120 may be transmitted from the graphics processing unit driver 2122 to the on-chip GPU memory 2116 via the system data bus 2136. The system data bus 2136 may utilize one or more of the encoding techniques described herein.

By way of example, the GPU programming 2120 may include a machine code vertex shading program, a machine code geometry shading program, a machine code fragment shading program, an artificial intelligence program, or any number of variations of each. The on-Chip Buffers 2124 are typically employed to store data that requires fast access to reduce the latency of such operations.

The GPU local memory 2106 typically includes less expensive off-chip dynamic random access memory (DRAM) and is also employed to store data and programming employed by the GPU 2110. As shown, the GPU local memory 2106 includes a frame buffer 2108. The frame buffer 2108 stores data for at least one two-dimensional surface that may be employed to drive the display devices 2128. Furthermore, the frame buffer 2108 may include more than one two-dimensional surface so that the GPU 2110 can render to one two-dimensional surface while a second two-dimensional surface is employed to drive the display devices 2128.

The display devices 2128 are one or more output devices capable of emitting a visual image corresponding to an input data signal. For example, a display device may be built using a cathode ray tube (CRT) monitor, a liquid crystal display, or any other suitable display system. The input data signals to the display devices 2128 are typically generated by scanning out the contents of one or more frames of image data that is stored in the frame buffer 2108.

The specific voltages, amperages, and other details described above are for illustrative purposes only. The invention may be practiced using a variety of specific voltage levels, currents, resistances, and so forth. And while the invention has been described above in the context of, e.g., a processor transmitting data to a memory, the PAM-4, etc., signaling techniques described herein may be practiced in any of a wide variety of signaling systems in which data is sent from a transmitting device to a receiving device, or between transceiving devices, and so forth.

Terms used herein should be accorded their ordinary meaning in the relevant arts, or the meaning indicated by their use in context, but if an express definition is provided, that meaning controls.

"Logic" herein refers to machine memory circuits, non-transitory machine-readable media, and/or circuitry that by way of its material and/or material-energy configuration comprises control and/or procedural signals, and/or settings and values (such as resistance, impedance, capacitance, inductance, current/voltage ratings, etc.), that may be applied to influence the operation of a device. Electronic circuits such as controllers, field programmable gate arrays, processors, and memory (both volatile and nonvolatile) comprising processor-executable instructions are examples of logic. Logic specifically excludes pure signals or software per se (however does not exclude machine memories comprising software and thereby forming configurations of matter).

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

Those skilled in the art will appreciate that logic may be distributed throughout one or more devices or components, and/or may be comprised of combinations memory, media, processing circuits and controllers, other circuits, and so on. Therefore, in the interest of clarity and correctness logic may not always be distinctly illustrated in drawings of devices and systems, although it is inherently present therein. The techniques and procedures described herein may be implemented via logic distributed in one or more computing devices. The particular distribution and choice of logic will vary according to implementation.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

What is claimed is:

1. A method of operating a serial data bus, the method comprising:
    configuring a first set of multiple data lanes of the serial data bus for PAM-4 communication, wherein PAM-4 encodes two bits of data on a data lane of the bus as one of four different voltage levels (symbols) to facilitate communication;
    configuring the data lanes not in the first set for PAM-433 communication, wherein PAM-433 utilizes PAM-4 (four-level encoding) encoding for some symbols, and three-level encoding for other symbols on a bus, wherein encoding a symbol is the physical configuration of a line driver circuit of the serial data bus to drive the voltage on the data lane to a particular value;
    the data lanes for the PAM-4 communication being separated from one another by at least one of the data lanes for the PAM-433 communication.

2. The method of claim 1, further comprising, for each data lane of the data lanes for the PAM-433 communication:
    dividing a series of data bits for communication on the data lane into a plurality of sequences of five bits each;
    encoding a first two bits of each of the sequences of five bits on the data lane as a four-level symbol; and
    encoding a next three bits of each of the sequences of five bits on the data lane as two three-level symbols.

3. The method of claim 2, wherein the two three-level symbols are selected to eliminate a possibility of maximum voltage deltas between four-level symbols on the serial data bus.

4. The method of claim 2, further comprising:
    selectively encoding a next three bits of each of the sequences of five bits on the serial data bus on condition that the first two bits of each of the sequences of five bits encodes as a four-level symbol at a highest symbol voltage level or a lowest symbol voltage level utilized by the serial data bus.

5. The method of claim 2, wherein the two three-level symbols comprise a first three-level symbol and a second three-level symbol, a voltage level of the first three-level symbol being either (a) at most two voltage steps below a voltage level of the four-level symbol, or (b) at most two voltage steps above the voltage level of the four-level symbol.

6. The method of claim 2, wherein the two three-level symbols comprise a first three-level symbol and a second three-level symbol, and further comprising:
    the sequences of five bits comprising a first sequence of five bits for communication on the serial data bus, and a second sequence of five bits for communication after the first sequence of five bits on the serial data bus; and
    a voltage level of the second three-level symbol of the first sequence of five bits being either (a) at most two voltage steps below a voltage level of the four-level symbol of the second sequence of five bits, or (b) at most two voltage steps above the voltage level of the four-level symbol of the second sequence of five bits.

7. The method of claim 1, further comprising, for each data lane of the data lanes for PAM-433 communication:
    dividing a series of data bits for communication on the data lane into sequences of seven bits;
    encoding a first four bits of each of the sequences of seven bits onto the data lane as two four-level symbols; and
    encoding a next three bits of each of the sequences of seven bits onto the data lane as two three-level symbols.

8. The method of claim 7, wherein the data lanes for PAM-433 communication comprise a first data lane and a second data lane, and transmission of the two four-level symbols is staggered in time between the first data lane and the second data lane.

9. The method of claim 8, wherein staggering the transmission of the two four-level symbols between the first data lane and the second data lane comprises transmission of two four-level symbols for the first data lane during a different clock interval than transmission of two four-level symbols for the second data lane.

10. The method of claim 7, further comprising:
    selectively encoding the next three bits of each of the sequences of seven bits on the data lane on condition that a second two bits of each of the sequences of seven bits encodes as a four-level symbol at a highest symbol voltage level or a lowest symbol voltage level utilized by the data lane.

11. The method of claim 7, wherein the two three-level symbols comprise a first three-level symbol and a second three-level symbol, a voltage level of the first three-level symbol being either (a) at most two voltage steps below a voltage level of a second one of the two four-level symbols, or (b) at most two voltage steps above the voltage level of the second one of the two four-level symbols.

12. The method of claim 7 wherein the two three-level symbols comprise a first three-level symbol and a second three-level symbol, and further comprising:
    the sequences of seven bits comprising a first sequence of seven bits for communication on the data lane, and a second sequence of seven bits for communication on the data lane after the communication of the first sequence of seven bits on the data lane; and
    a voltage level of the second three-level symbol of the first sequence of seven bits being either (a) at most two voltage steps below a voltage level of a second one of the two four-level symbols of the first sequence of seven bits, or (b) at most two voltage steps above the second one of the two four-level symbols of the first sequence of seven bits.

13. The method of claim 1, further comprising:
    configuring one data lane of the serial data bus for PAM-4 communications of exclusively CRC values.

14. The method of claim 1, further comprising:
    configuring one data lane of the serial data bus for communication of CRC values utilizing symbols consisting of two voltage levels.

15. The method of claim 1, further comprising:
terminating a data transfer request on each of the data lanes for PAM-433 communication with a symbol consisting of two voltage levels.

16. The method of claim 1, the serial data bus consisting of nine data lanes.

17. The method of claim 16, wherein three of the nine data lanes are configured for PAM-4 communication and are each separated from one another by two data lanes configured for PAM-433 communication.

18. The method of claim 1, the serial data bus consisting of ten data lanes.

19. The method of claim 18, wherein four of the ten data lanes are configured for PAM-4 communication and are each separated from one another by two data lanes configured for PAM-433 communication.

20. The method of claim 19, wherein one of the four data lanes configured for PAM-4 communication is a dedicated CRC data lane.

* * * * *